United States Patent
Porto et al.

(10) Patent No.: US 12,039,796 B2
(45) Date of Patent: Jul. 16, 2024

(54) METHOD FOR CLASSIFYING CELLS

(71) Applicant: Sartorius BioAnalytical Instruments, Inc., Bohemia, NY (US)

(72) Inventors: Daniel Porto, Detroit, MI (US);
Timothy Jackson, Hatfield (GB);
Gillian Lovell, St. Albans (GB); Nevine Holtz, Saline, MI (US)

(73) Assignee: Sartorius BioAnalytical Instruments, Inc., Bohemia, NY (US)

( * ) Notice: Subject to any disclaimer, the term of this patent is extended or adjusted under 35 U.S.C. 154(b) by 740 days.

(21) Appl. No.: 17/099,983

(22) Filed: Nov. 17, 2020

(65) Prior Publication Data
US 2021/0073513 A1 Mar. 11, 2021

Related U.S. Application Data

(63) Continuation-in-part of application No. 16/265,910, filed on Feb. 1, 2019, now Pat. No. 10,885,631.

(51) Int. Cl.
*G06V 20/69* (2022.01)
*G01N 21/64* (2006.01)
(Continued)

(52) U.S. Cl.
CPC ....... *G06V 20/698* (2022.01); *G01N 21/6458* (2013.01); *G06T 7/0012* (2013.01);
(Continued)

(58) Field of Classification Search
CPC .. G06V 20/693; G06V 20/695; G06V 20/698; G01N 21/6452; G01N 21/6458;
(Continued)

(56) References Cited

U.S. PATENT DOCUMENTS 10,176,565 B2   1/2019 Greenfield et al.
2009/0257640 A1  10/2009 Gossage et al.
(Continued)

FOREIGN PATENT DOCUMENTS

WO   2013104938 A2   7/2013
WO   2015168026 A2  11/2015
(Continued)

OTHER PUBLICATIONS

Sediq et al., "Label-Free, Flow-Imaging Methods for Determination of Cell Concentration and Viability", CrossMark, 2018, 10 pages.
(Continued)

*Primary Examiner* — Nay A Maung
*Assistant Examiner* — Jose M Torres
(74) *Attorney, Agent, or Firm* — McDonnell Boehnen Hulbert & Berghoff LLP

(57) ABSTRACT

The disclosure provides example embodiments for automatically or semi-automatically classifying cells in microscopic images of biological samples. These embodiments include methods for selecting training sets for the development of classifier models. The disclosed selection embodiments can allow for the re-training of classifier models using training examples that have been subjected to the same or similar incubation conditions as target samples. These selection embodiments can reduce the amount of human effort required to specify the training examples. The disclosed embodiments also include the classification of individual cells based on metrics determined for the cells using phase contrast imagery and defocused brightfield imagery. These metrics can include size, shape, texture, and intensity-based metrics. These metrics are determined based on segmentation of the underlying imagery. The segmentation is based, in some embodiments, on phase contrast imagery and/or defocused brightfield imagery of biological samples.

22 Claims, 15 Drawing Sheets
(8 of 15 Drawing Sheet(s) Filed in Color)

— 1000

— 1005
Obtaining two or more images of a target sample, wherein the target sample comprises one or more cells centered around a focal plane for the target sample, wherein the two or more images include a phase contrast image and one or more brightfield images, wherein the one or more brightfield images includes at least one brightfield image that represents an image of the target sample that is not focused at the focal plane — 1010
Based on the two or more images, determining a set of metrics for each cell present in the target sample — 1015
Classifying a cell in the target sample by applying a trained model to the set of metrics for the cell

(51) Int. Cl.
  *G06T 7/00* (2017.01)
  *G06T 7/11* (2017.01)
  *G06T 7/136* (2017.01)
  *G06T 7/174* (2017.01)
  *G06T 7/187* (2017.01)

(52) U.S. Cl.
  CPC ............... *G06T 7/11* (2017.01); *G06T 7/136* (2017.01); *G06T 7/174* (2017.01); *G06T 7/187* (2017.01); *G06V 20/693* (2022.01); *G06V 20/695* (2022.01); *G01N 21/6452* (2013.01); *G06T 2207/10056* (2013.01); *G06T 2207/10064* (2013.01); *G06T 2207/20156* (2013.01); *G06T 2207/30024* (2013.01); *G06T 2207/30072* (2013.01); *G06T 2207/30242* (2013.01)

(58) Field of Classification Search
  CPC ......... G06T 7/0012; G06T 7/11; G06T 7/136; G06T 7/174; G06T 7/187; G06T 2207/10056; G06T 2207/10064; G06T 2207/20156; G06T 2207/30024; G06T 2207/30072; G06T 2207/30242
  See application file for complete search history.

(56) References Cited

U.S. PATENT DOCUMENTS

| | | | |
|---|---|---|---|
| 2010/0182417 | A1 | 7/2010 | Takagi et al. |
| 2011/0254943 | A1 | 10/2011 | Ozinsky et al. |
| 2017/0052106 | A1* | 2/2017 | Hennig ............... G01N 15/1475 |
| 2017/0108686 | A1* | 4/2017 | Chan ....................... G02B 21/26 |
| 2017/0169567 | A1* | 6/2017 | Chefd'Hotel ......... G06T 7/0012 |
| 2018/0113064 | A1* | 4/2018 | Allier ...................... G01N 21/51 |
| 2018/0246313 | A1* | 8/2018 | Eshel ................. G01N 21/8851 |
| 2018/0315190 | A1* | 11/2018 | Sasagawa ................. G06N 3/08 |
| 2018/0322327 | A1* | 11/2018 | Smith ................... G06V 20/698 |
| 2018/0322660 | A1 | 11/2018 | Smith |
| 2019/0228527 | A1* | 7/2019 | Ramirez .................... G06T 7/41 |
| 2019/0384047 | A1 | 12/2019 | Johnson et al. |
| 2020/0082222 | A1 | 3/2020 | Cohen et al. |
| 2020/0167914 | A1 | 5/2020 | Stamatoyannopoulos et al. |
| 2020/0250822 | A1 | 8/2020 | Jackson et al. |

FOREIGN PATENT DOCUMENTS

| | | |
|---|---|---|
| WO | 2018224852 A2 | 12/2018 |
| WO | 2021/051045 | 3/2021 |

OTHER PUBLICATIONS

Bhaskar et al., "A methodology for morphological feature extraction and unsupervised cell classification", PLOS Submission, Apr. 30, 2019, 30 pages.
Godinez et al., "A multi-scale convolutional neural network for phenotyping high-content cellular images", Bioinformatics, 33(13), 2017, 10 pages.
Blasi et al., "Label-free cell cycle analysis for high-throughput imaging flow cytometry", Nature Communications, Published Jan. 7, 2016, 9 pages.
Stassen et al., "PARC: ultrafast and accurate clustering of phenotypic data of millions of single cells", Bioinformatics, 36(9), 2020, 9 pages.
Aftab et al., "Detection of Cell Aggregation and Altered Cell Viability by Automated Label-Free Video Microscopy: A Promising Alternative to Endpoint Viability Assays in High-Throughput Screening", Journal of Biomolecular Screening, 2015, vol. 20(3), pp. 372-381.
Perlman et al., "Multidimensional Drug Profiling by Automated Microscopy", vol. 306, Nov. 12, 2004, 5 pages.
Yao et al., "Cell Type Classification and Unsupervised Morphological Phenotyping From Low-Resolution Images Using Deep Learning", Scientific Reports, Published Sep. 17, 2019, 13 pages.
Chen et al., "Deep Learning in Label-Free Cell Classification", Scientific Reports, Published Mar. 15, 2016, 16 pages.
Ulrich, "CellProfiler goes 3D", Broadminded Blog.
Hur et al., "Deformability-based cell classification and enrichment using inertial microfluidics", Lab on a Chip, Issue 5, 2011.
Ke et al., "The xCELLigence System for Real-Time and Label-Free Monitoring of Cell Viability", Mammalian Cell Viability, Mar. 9, 2011.
Allier et al., "Label-free cell viability assay using lens-free microscopy", Proceedings vol. 10497, Imaging, Manipulation, and Analysis of Biomolecules, Cells, and Tissues XVI, Feb. 20, 2018.
Loo et al., "Image-based multivariate profiling of drug responses from single cells", Nature Methods, 4, Apr. 1, 2007.
International Preliminary Report on Patentability for PCT/US2021/059417, dated May 16, 2023.
International Preliminary Report on Patentability for PCT/US2021/059419, dated May 16, 2023.
Falk T, Mai D, Bensch R, Çiçek O, Abdulkadir A, Marrakchi Y, Böhm A, Deubner J, Jäckel Z, Selwald K, Dovzhenko A, Tietz O, Dal Bosco C, Walsh S, Saltukoglu D, Tay TL, Prinz M, Palme K, Simons M, Diester I, Brox T, Ronneberger O. "U-Net: deep learning for cell counting, detection, and morphometry." Nature Methods, vol. 16, No. 1, Jan. 2019, pp. 67-70.
Strbkova L, Zicha D, Vesely P. Chmelik R. "Automated classification of cell morphology by coherence-controlled holographic microscopy." J. Biomedical Optics, vol. 22, No. 8, Aug. 23, 2017, p. 1.
International Search Report and Written Opinion for PCT/US2020/015216, dated Aug. 12, 2021.

* cited by examiner

```
                                                          ← 300
         ┌ 305
    ┌──────────────────────────────────────────────────┐
    │ Generating, via a processor, at least one phase contrast image of a │
    │ biological specimen comprising one or more cells based on at least  │
    │      one bright field image centered around a focal plane for the   │
    │                        biological specimen                          │
    └──────────────────────────────────────────────────┘
              ┌ 310          ▼
    ┌──────────────────────────────────────────────────┐
    │ Generating, via the processor, a confluence mask in the form of a  │
    │      binary image based on the at least one phase contrast image   │
    └──────────────────────────────────────────────────┘
              ┌ 315          ▼
    ┌──────────────────────────────────────────────────┐
    │ Receiving, via the processor, a first brightfield image of one or  │
    │    more cells in the biological specimen at a defocusing distance  │
    │   above the focal plane and a second brightfield image of the one or│
    │    more cells in the biological specimen at the defocusing distance │
    │                          below the focal plane                      │
    └──────────────────────────────────────────────────┘
              ┌ 320          ▼
    ┌──────────────────────────────────────────────────┐
    │ Generating, via the processor, a cell image of the one or more cells│
    │   in the biological specimen based on the first brightfield image and│
    │                        the second brightfield image                  │
    └──────────────────────────────────────────────────┘
              ┌ 325          ▼
    ┌──────────────────────────────────────────────────┐
    │ Generating, via the processor, a seed mask based on the cell image │
    │              and the at least one phase contrast image             │
    └──────────────────────────────────────────────────┘
              ┌ 330          ▼
    ┌──────────────────────────────────────────────────┐
    │ Generating, via the processor, an image of the one or more cells in│
    │ the biological specimen showing a cell-by-cell segmentation mask   │
    │            based on the seed mask and the confluence mask          │
    └──────────────────────────────────────────────────┘
```

FIG. 3

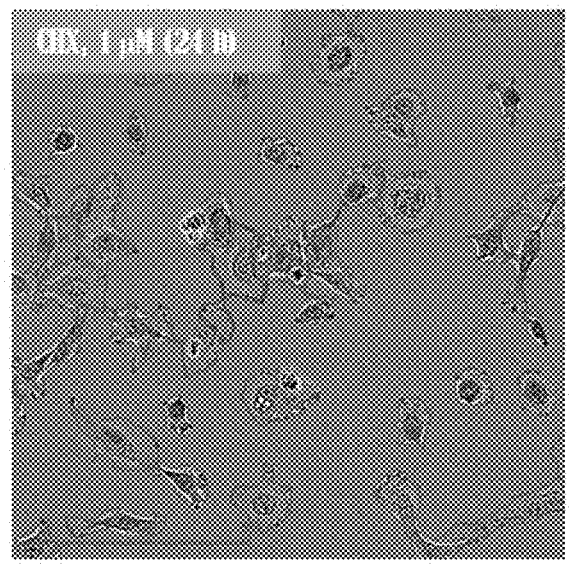
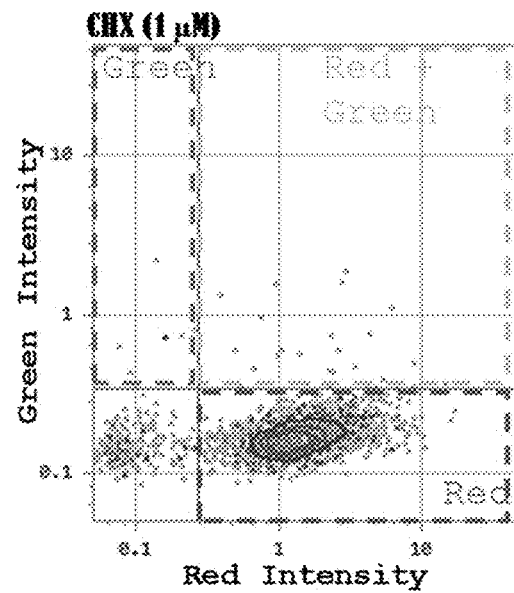
FIG. 6E
FIG. 6F
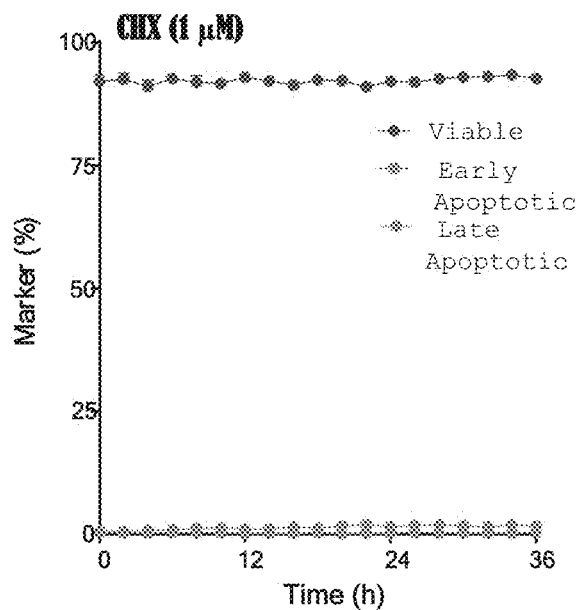
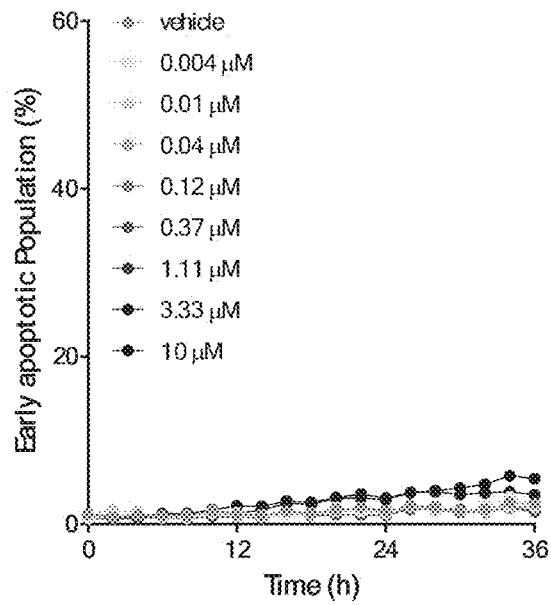
FIG. 6G
FIG. 6H

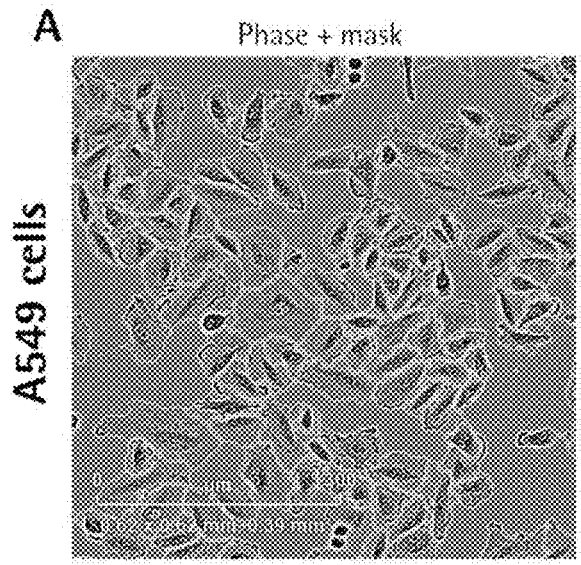
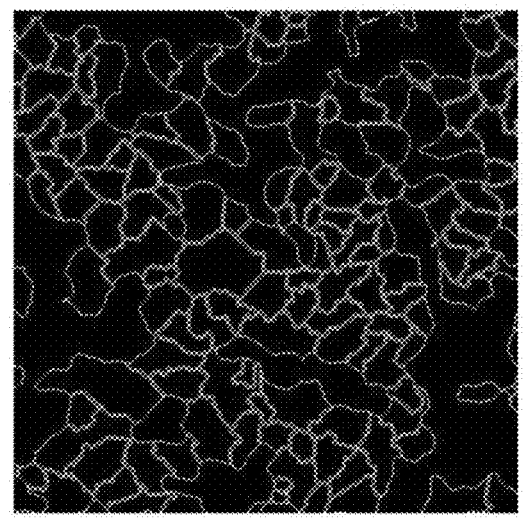
FIG. 7A
FIG. 7B
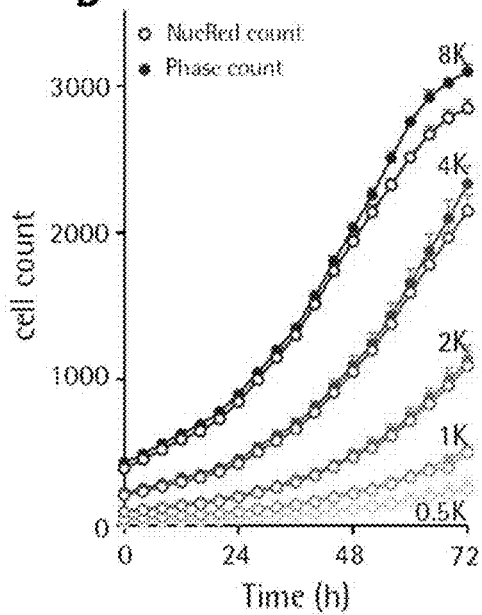
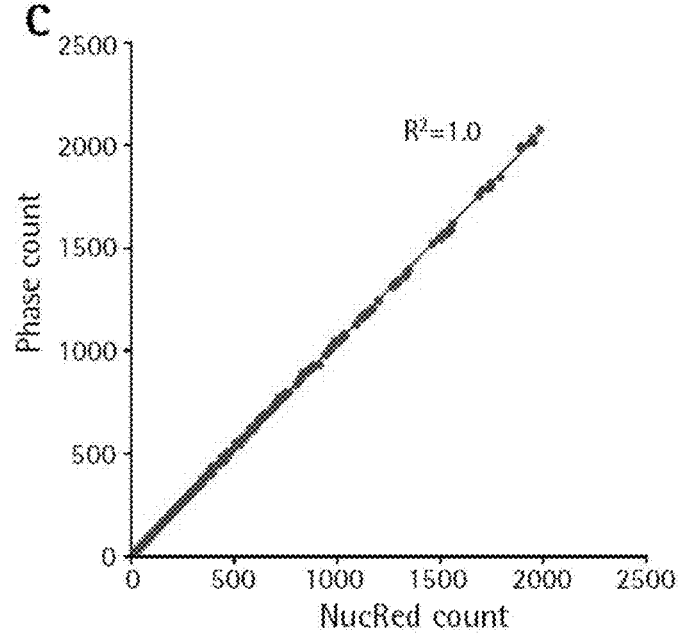
FIG. 7C
FIG. 7D

900

905
Obtaining three or more images of a target sample, wherein the target sample comprises one or more cells centered around a focal plane for the target sample, wherein the three or more images include a phase contrast image, a first brightfield image, and a second brightfield image, wherein the first brightfield image represents an image of the target sample focused at a first defocusing distance above the focal plane, and wherein the second brightfield image represents an image of the target sample focused at a second defocusing distance below the focal plane

910
Determining a cell image of the target sample based on the first and second brightfield images

915
Determining a target segmentation map for the target sample based on the cell image and the phase contrast image

920
Based on the two or more images of the target sample and the target segmentation map, determining a set of metrics for each cell present in the target sample

925
Classifying a cell in the target sample, wherein classifying the cell comprises applying the set of metrics of the cell to a trained classifier

FIG. 9

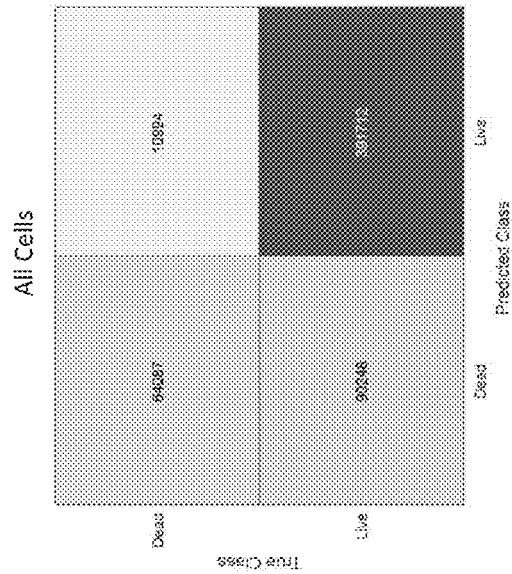
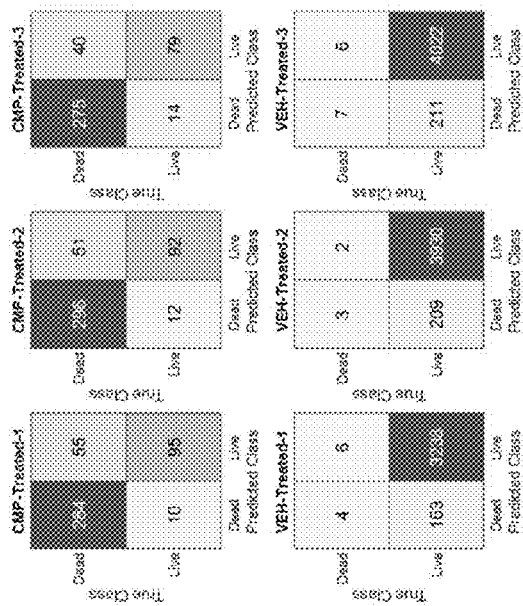
FIG. 14A
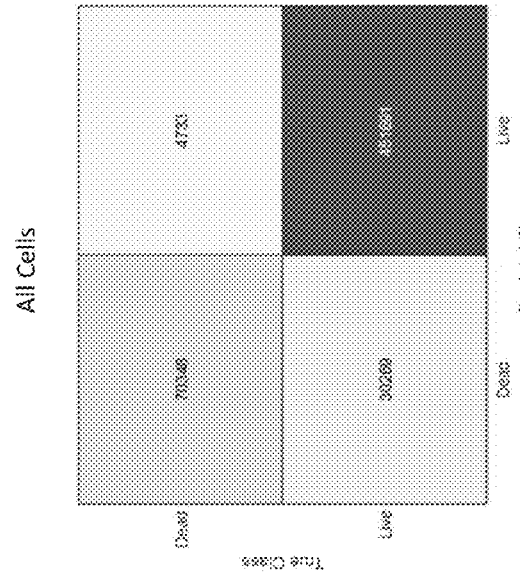
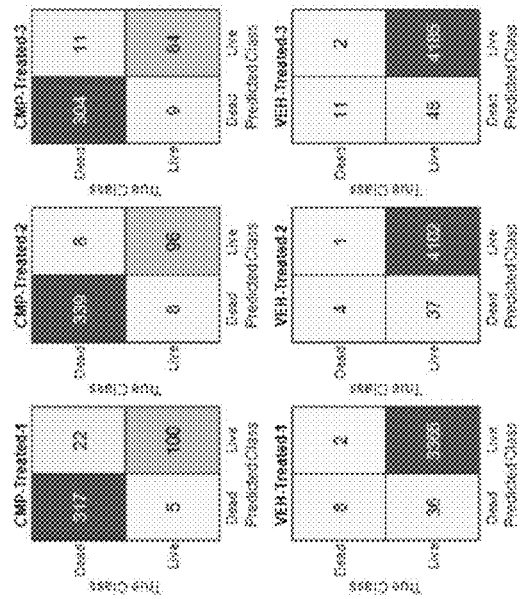
FIG. 14B

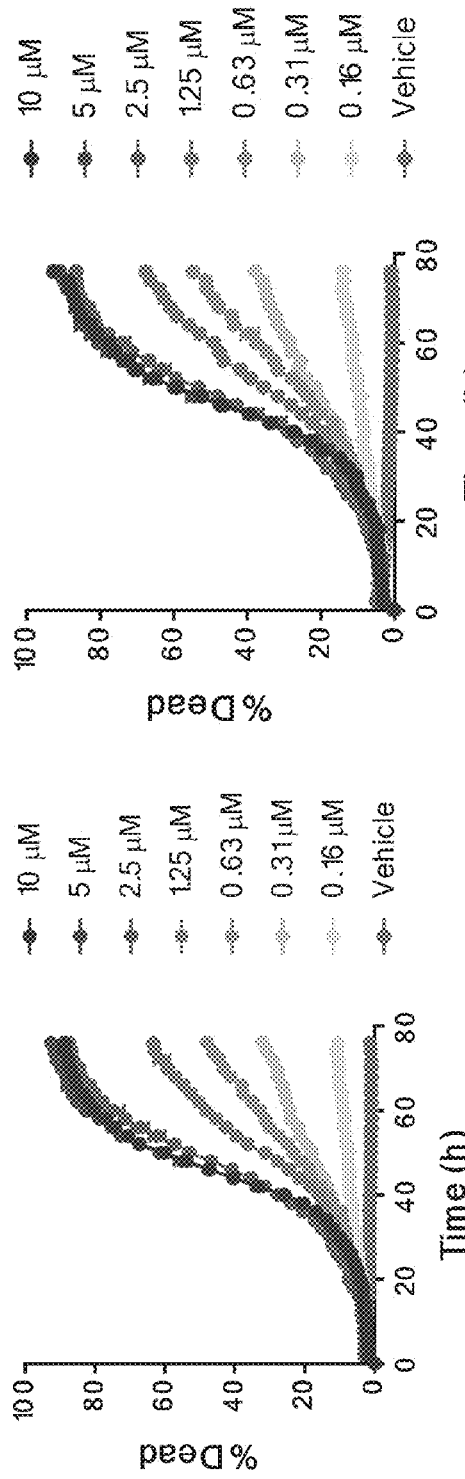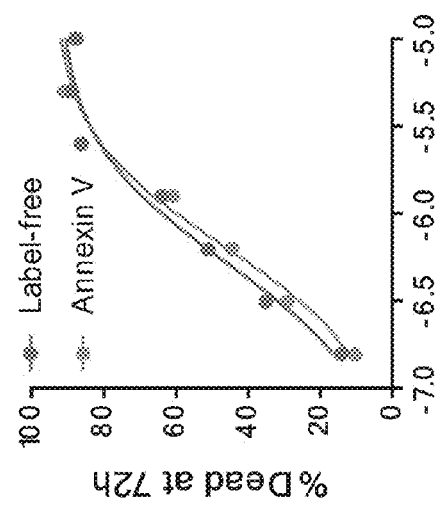
FIG. 16A
FIG. 16B
FIG. 16C

METHOD FOR CLASSIFYING CELLS

CROSS REFERENCE TO RELATED APPLICATION

This application is a continuation-in-part of U.S. application Ser. No. 16/265,910, filed Feb. 1, 2019, the contents of which are hereby incorporated by reference. The contents of U.S. application Ser. No. 16/950,368, filed on Nov. 17, 2020, entitled "Computational Model for Analyzing Images of a Biological Specimen" is also hereby incorporated by reference.

BACKGROUND

Current known methods of segmenting cells in biological specimens require fluorescently-labeled proteins, e.g., thresholding a nuclear-localizing protein like histones for a marker-controlled segmentation algorithm. Alternative label-free techniques exist, such as ptychography-based methods, lateral shearing interferometry and digital holography, but these require a complex image acquisition setup and a complicated image formation algorithm with long processing times. Another label-free technique includes deep-learning algorithms (e.g., convolutional neural networks) that require extensive training on large data sets of images and slow processing times. Other methods use a brightfield image in an out-of-focus condition that requires specialized hardware like a pinhole aperture and do not permit cell-by-cell segmentation.

Classification of cells in microscopy images (e.g., of cells whose location and extent within the image have been determined by segmentation) can facilitate a variety of applications, including assessment of the effects of a variety of experimental conditions by quantifying the effects of those conditions in terms of the increase or decrease in the number of cells present in a sample and/or a proportion of the cells that correspond to a variety of conditions (e.g., differentiated vs. non-differentiated). Cell classification can be performed manually, however, such manual classification can be expensive in terms of time and effort and may result in inaccurate classification of cells. Automated methods are also available, however, these methods may require fluorescently-labeled proteins, which can interrupt the natural biology of the cells, or may require providing large sets of training examples to train the automated algorithms.

SUMMARY

In one aspect, an example method for classification of cells is disclosed. The method includes: (i) obtaining a set of images of a plurality of biological samples, wherein the set of images includes at least one image of each sample of the plurality of biological samples; (ii) obtaining an indication of a first set of cells within the plurality of biological samples and obtaining an indication of a second set of cells within the plurality of biological samples, wherein the first set of cells is associated with a first condition and the second set of cells is associated with a second condition; (iii) based on the set of images, the indication of the first set of cells, and the indication of the second set of cells, determining a first plurality of sets of metrics, wherein the first plurality of sets of metrics include a set of metrics for each cell of the first set of cells and a set of metrics for each cell of the second set of cells; (iv) based on the first plurality of sets of metrics, using a supervised learning algorithm to generate a model to distinguish between cells in the first set of cells and cells in the second set of cells, thereby generating a trained model; (v) based on the set of images, determining a second plurality of sets of metrics, wherein the second plurality of sets of metrics include a set of metrics for each cell present in a target sample; and (vi) classifying a cell in the target sample, wherein classifying the cell includes applying the trained model to the set of metrics for the cell.

In another aspect, an example method for classification of cells is provided. The method includes: (i) obtaining three or more images of a target sample, wherein the target sample includes one or more cells centered around a focal plane for the target sample, wherein the three or more images include a phase contrast image, a first brightfield image, and a second brightfield image, wherein the first brightfield image represents an image of the target sample focused at a first defocusing distance above the focal plane, and wherein the second brightfield image represents an image of the target sample focused at a second defocusing distance below the focal plane; (ii) determining a cell image of the target sample based on the first and second brightfield images; (iii) determining a target segmentation map for the target sample based on the cell image and the phase contrast image; (iv) based on the two or more images of the target sample and the target segmentation map, determining a set of metrics for each cell present in the target sample; and (v) classifying a cell in the target sample, wherein classifying the cell includes applying the set of metrics of the cell to a trained classifier.

In yet another aspect, an example method for classification of cells is provided. The method includes: (i) obtaining two or more images of a target sample, wherein the target sample includes one or more cells centered around a focal plane for the target sample, wherein the two or more images include a phase contrast image and one or more brightfield images, wherein the one or more brightfield images includes at least one brightfield image that represents an image of the target sample that is not focused at the focal plane; (ii) based on the two or more images, determining a set of metrics for each cell present in the target sample; and (iii) classifying a cell in the target sample by applying a trained model to the set of metrics for the cell.

In another aspect, a non-transitory computer-readable medium is provided that is configured to store at least computer-readable instructions that, when executed by one or more processors of a computing device, cause the computing device to perform controller operations to perform any of the above methods.

In yet another aspect, a system for assaying biological specimens is provided that includes: (i) an optical microscope; (ii) a controller, wherein the controller comprises one or more processors; and (iii) a non-transitory computer-readable medium that is configured to store at least computer-readable instructions that, when executed by the controller, cause the controller to perform controller operations to perform any of the above methods.

The features, functions, and advantages that have been discussed can be achieved independently in various examples or may be combined in yet other examples further details of which can be seen with reference to the following description and drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 3 shows a flowchart of a method, according to an example implementation;

FIG. 6E shows experimental results of a cell-by-cell segmentation mask, generated according to an example implementation, for a cell image response at 24 hours after a time course of HT1080 fibrosarcoma apoptosis following a cyclohexamide (CHX, cytostatic) treatment;

FIG. 6F shows cell subsets classified based on red (Nuclight Red, a cell health indicator, "NucRed") and green fluorescence (Caspase 3/7, an apoptosis indicator), according to the implementation of FIG. 6E;

FIG. 6G shows there was a lack of apoptosis but a decrease in cell counts after CHX treatment, according to the implementation of FIG. 6E;

FIG. 6H shows concentration response time courses of the early apoptotic population (percentage of total cells exhibiting red and green fluorescence), according to the implementation of FIG. 6E;

FIG. 7A shows a cell-by-cell segmentation mask imposed over a phase contrast image for label-free cell counting of adherent cells using cell-by-cell segmentation analysis, generated according to an example implementation. Various densities of A549 Cells labelled with NucLight Red reagent were analyzed with both the label-free cell-by-cell analysis and with the red nuclear count analysis to validate the label-free counting over time;

FIG. 7B shows the cell-by-cell segmentation mask according to FIG. 7A without the phase contrast image in the background;

FIG. 7C shows a time course of phase count and NucRed count data across densities, according to the implementation of FIG. 7A;

FIG. 7D shows a correlation of count data over 48 hours and demonstrates R2 value of 1 with a slope of 1, according to the implementation of FIG. 7A;

FIG. 9 shows a flowchart of a method, according to an example implementation;

FIGS. 14A and 14B illustrate the experimental predictive accuracy of methods described herein;

FIGS. 16A, 16B, and 16C illustrate the experimental predictive accuracy of methods described herein as compared to label-based classification.

Figure 1:
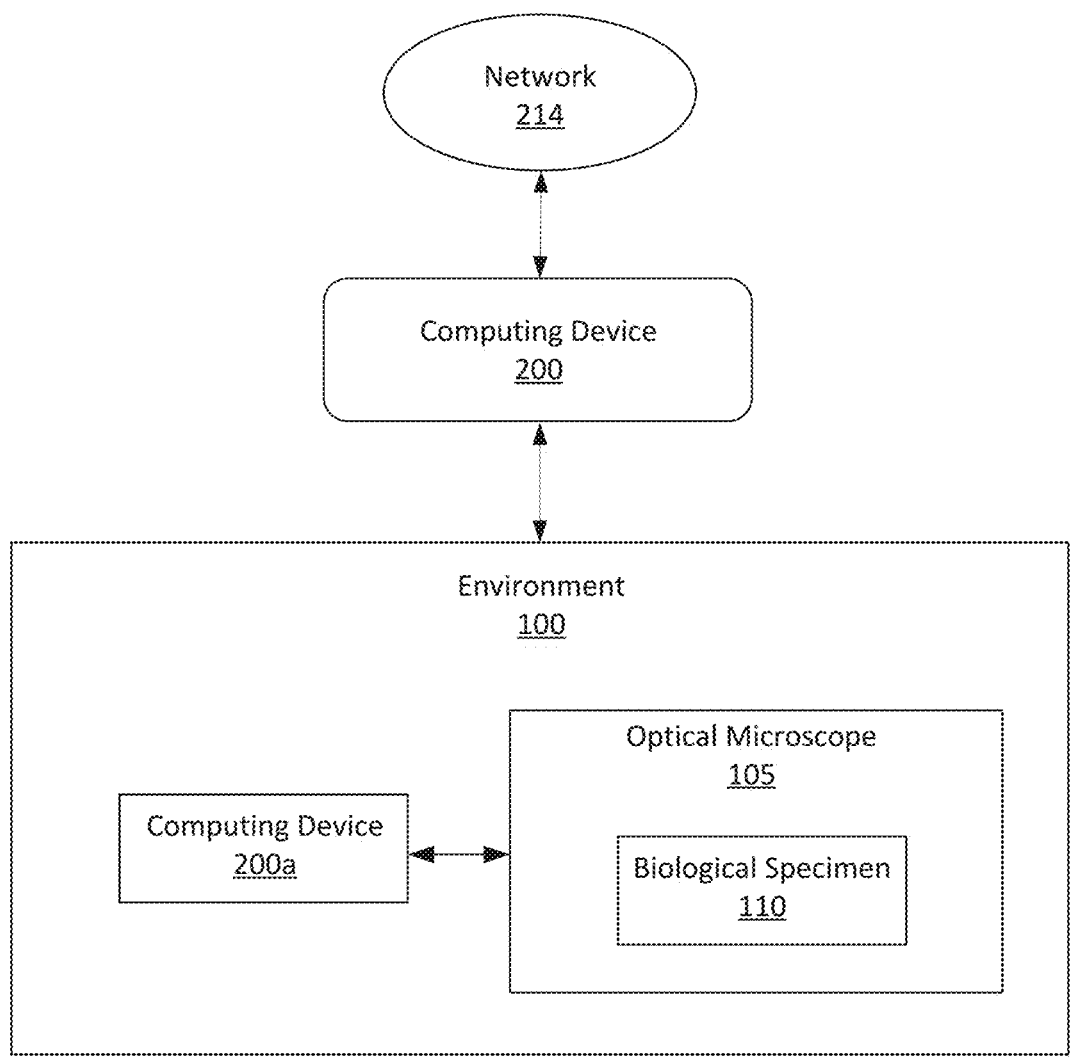
FIG. 1 is a functional block diagram of a system, according to one example implementation.

The drawings are for the purpose of illustrating examples, but it is understood that the inventions are not limited to the arrangements and instrumentalities shown in the drawings.

DETAILED DESCRIPTION

I. Overview

Microscopic imaging of biological samples can facilitate many analyses of the contents of the samples and of their responses to a variety of applied experimental conditions. Such analyses can include counting the cells after classifying the cells in order to determine the effect of the applied conditions. For example, a sample could include a set of differentiated cells and a set of undifferentiated cells, and analysis of the sample could include determining the proportion of the cells that are differentiated, e.g., in order to determine the effectiveness of an applied condition in causing the undifferentiated cells to become differentiated. To perform such an analysis it is necessary to localize each of the cells in the sample and then to classify each of the cells. Such a classification process could be performed manually. However, manual classification can be very expensive, time consuming, and can result in inaccurate classifications.

Embodiments described herein proved a variety of methods for automatically classifying cells based on phase contrast images, brightfield images, composites of phase contrast and/or brightfield images, or other microscopic imagery of the cells. Some of these embodiments include using specified sets of cells within one or more biological samples to train a model to classify the cells. Such a trained model can then be applied to additional cells to classify those additional cells. In order to classify a particular cell, a set of metrics is determined for the cell based on one or more images that represent the cell. Such metrics can include metrics related to the size and/or shape of the cell. Such metrics may additionally or alternatively be related to the texture or intensity of the cell as represented in one or more phase contrast images, brightfield images, fluorescence images, or composite images. For example, one or more of the metrics could be related to the texture of the cells (e.g., the variability and/or structure of variability of brightness or intensity across the area of the cell) in fluorescence images or in some other variety of images (e.g., phase contrast, brightfield). The determined set of metrics for a cell can then be applied to a trained model in order to classify the cells.

The sets of cells used to train the model can be identified in a variety of ways. In some examples, the cells could be manually indicated by a user. This could include the user manually indicating whole wells of a multi-well sample plate. Additionally or alternatively, the user could manually indicate individual cells within one or more biological samples. In yet another example, the user could specify points in time to indicate sets of cells, e.g., setting a first point in time before which all cells in a sample belong to a first set (e.g., an undifferentiated set) and setting a second point in time after which all cells in a sample belong to a second set (e.g., a differentiated set). In some examples, the cells could be automatically or semi-automatically indicated. This could include identifying sets of cells based on fluorescence images of the cells (e.g., cells with supra-threshold fluorescence signals could be assigned to a first group, while cells with sub-threshold fluorescence signals could be assigned to a second group). In another example, an unsupervised or semi-supervised learning algorithm could cluster or otherwise aggregate the cells into sets that could then be used to train a classifier.

II. Example Architecture

FIG. 1 is a block diagram showing an operating environment 100 that includes or involves, for example, an optical microscope 105 and a biological specimen 110 having one or more cells. Methods 300, 800, 900, and 1000 in FIGS. 3-5, 8, 9, and 10 described below shows embodiments of methods that can be implemented within this operating environment 100.

Figure 2:
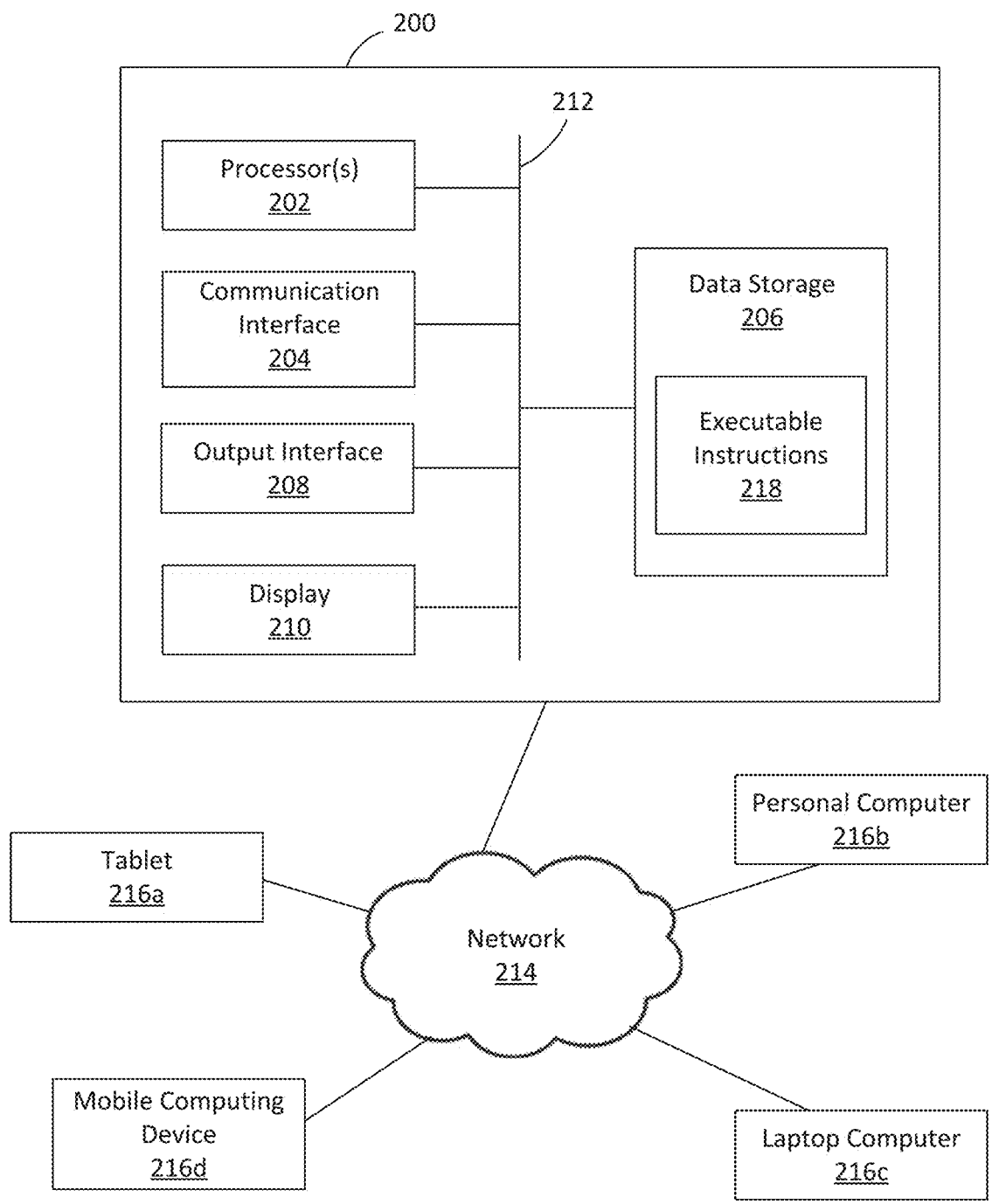
FIG. 2 depicts a block diagram of a computing device and a computer network, according to an example implementation.

FIG. 2 is a block diagram illustrating an example of a computing device 200, according to an example implementation, that is configured to interface with operating environment 100, either directly or indirectly. The computing device 200 may be used to perform functions of methods shown in FIGS. 3-5, 8, 9, and 10 and described below. In particular, computing device 200 can be configured to perform one or more functions, including image generating functions that are based, in part, on images obtained by the optical microscope 105, for example. The computing device 200 has a processor(s) 202, and also a communication interface 204, data storage 206, an output interface 208, and a display 210 each connected to a communication bus 212. The computing device 200 may also include hardware to enable communication within the computing device 200 and between the computing device 200 and other devices (e.g. not shown). The hardware may include transmitters, receivers, and antennas, for example.

The communication interface 204 may be a wireless interface and/or one or more wired interfaces that allow for both short-range communication and long-range communication to one or more networks 214 or to one or more remote computing devices 216 (e.g., a tablet 216a, a personal computer 216b, a laptop computer 216c and a mobile computing device 216d, for example). Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wired interfaces may include Ethernet interface, a Universal Serial Bus (USB) interface, or similar interface to communicate via a wire, a twisted pair of wires, a coaxial cable, an optical link, a fiber-optic link, or other physical connection to a wired network. Thus, the communication interface 204 may be configured to receive input data from one or more devices, and may also be configured to send output data to other devices.

The communication interface 204 may also include a user-input device, such as a keyboard, a keypad, a touch screen, a touch pad, a computer mouse, a track ball and/or other similar devices, for example.

The data storage 206 may include or take the form of one or more computer-readable storage media that can be read or accessed by the processor(s) 202. The computer-readable storage media can include volatile and/or non-volatile storage components, such as optical, magnetic, organic or other memory or disc storage, which can be integrated in whole or in part with the processor(s) 202. The data storage 206 is considered non-transitory computer readable media. In some examples, the data storage 206 can be implemented using a single physical device (e.g., one optical, magnetic, organic or other memory or disc storage unit), while in other examples, the data storage 206 can be implemented using two or more physical devices.

The data storage 206 thus is a non-transitory computer readable storage medium, and executable instructions 218 are stored thereon. The instructions 218 include computer executable code. When the instructions 218 are executed by the processor(s) 202, the processor(s) 202 are caused to perform functions. Such functions include, but are not limited to, receiving brightfield images from the optical microscope 100 and generating a phase contrast image, a confluence mask, a cell image, a seed mask, a cell-by-cell segmentation mask and fluorescent images.

The processor(s) 202 may be a general-purpose processor or a special purpose processor (e.g., digital signal processors, application specific integrated circuits, etc.). The processor(s) 202 may receive inputs from the communication interface 204, and process the inputs to generate outputs that are stored in the data storage 206 and output to the display 210. The processor(s) 202 can be configured to execute the executable instructions 218 (e.g., computer-readable program instructions) that are stored in the data storage 206 and are executable to provide the functionality of the computing device 200 described herein.

The output interface 208 outputs information to the display 210 or to other components as well. Thus, the output interface 208 may be similar to the communication interface 204 and can be a wireless interface (e.g., transmitter) or a wired interface as well. The output interface 208 may send commands to one or more controllable devices, for example.

The computing device 200 shown in FIG. 2 may also be representative of a local computing device 200a in operating environment 100, for example, in communication with optical microscope 105. This local computing device 200a may perform one or more of the steps of the methods 300, 800, 900, 1000 described below, may receive input from a user and/or may send image data and user input to computing device 200 to perform all or some of the steps of methods 300, 800, 900, and/or 1000. In addition, in one optional example embodiment, the Incucyte® platform may be utilized to perform one or more of methods 300, 800, 900, 1000 and includes the combined functionality of computing device 200 and optical microscope 105.

Figure 8:
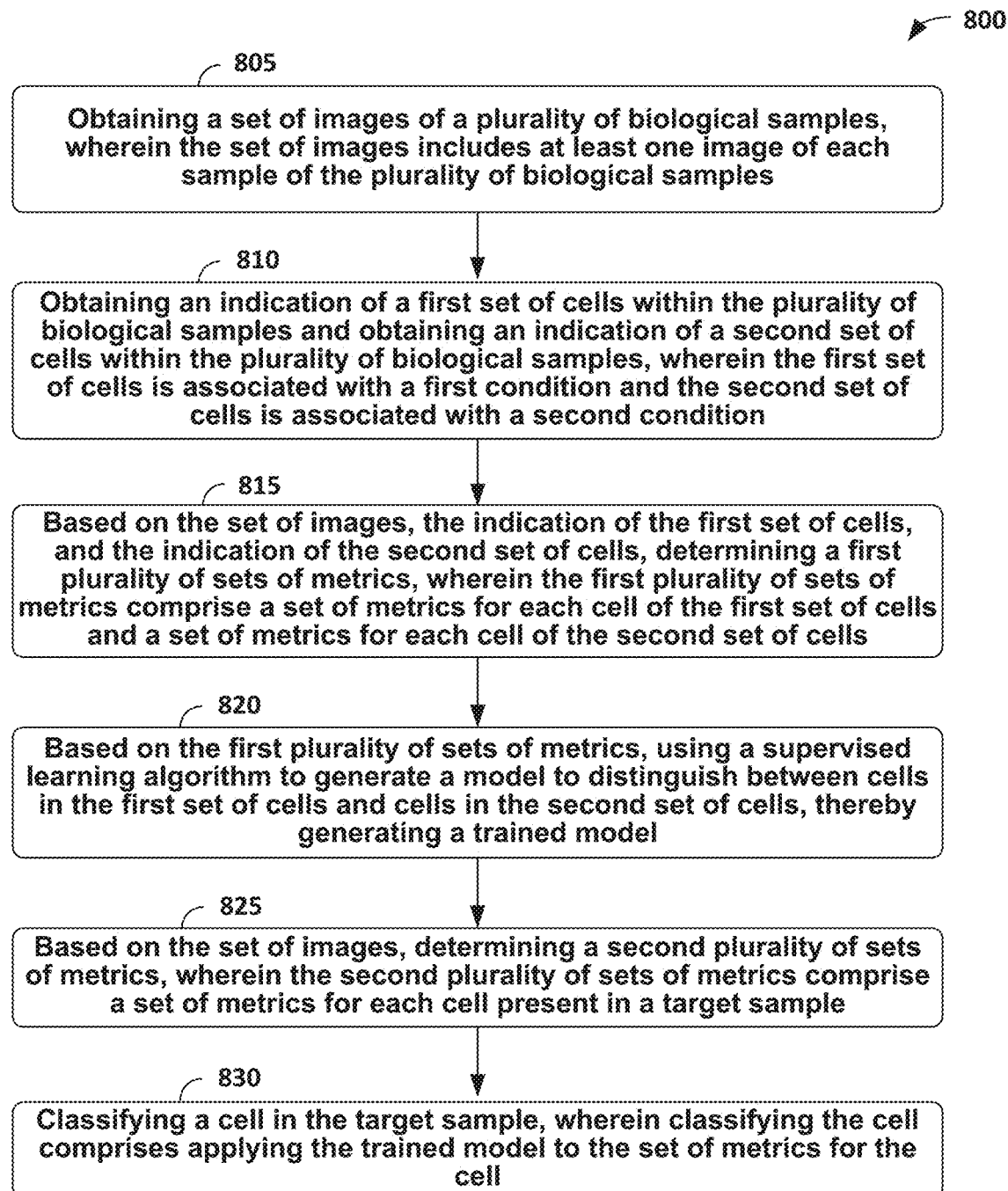
FIG. 8 shows a flowchart of a method, according to an example implementation.
Figure 10:
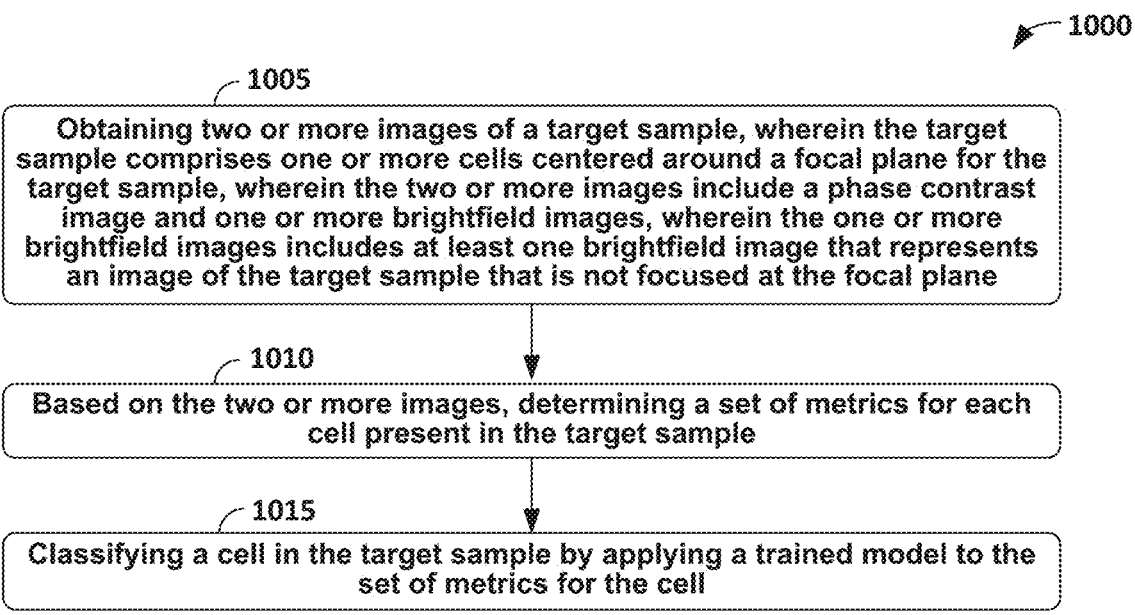
FIG. 10 shows a flowchart of a method, according to an example implementation.

FIG. 3 shows a flowchart of an example method 300 to achieve cell-by-cell segmentation for one or more cells of a biological specimen 110, according to an example implementation. FIGS. 8, 9, and 10 show flowcharts of an example methods 800, 900, and 1000, respectively, to achieve cell-by-cell classification of one or more cells of a biological specimen 110, according to example implementations. Methods 300, 800, 900, 1000 shown in FIGS. 3, 8, 9, 10 present examples of methods that could be used with the computing device 200 of FIG. 2, for example. Further, devices or systems may be used or configured to perform logical functions presented in FIGS. 3, 8, 9, and/or 10. In some instances, components of the devices and/or systems may be configured to perform the functions such that the components are configured and structured with hardware and/or software to enable such performance. Components of the devices and/or systems may be arranged to be adapted to, capable of, or suited for performing the functions, such as when operated in a specific manner. Methods 300, 800, 900, 100 may include one or more operations, functions, or actions as illustrated by one or more of the blocks in those figured (e.g., blocks 305-330). Although the blocks of each method are illustrated in a sequential order within each figure, some of these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of the present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time such as register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIGS. 3, 8, 9, 10, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

III. Example Methods

As used herein, a "brightfield image" refers to an image obtained via a microscope based on a biological sample illuminated from below such that the light waves pass through transparent portions of the biological sample. The varying brightness levels are then captured in a brightfield image.

As used herein, a "phase contrast image" refers to an image obtained via a microscope, either directly or indirectly, based on a biological sample illuminated from below capturing phase shifts of light passing through the biological sample due to differences in the refractive index of different portions of the biological sample. For example, when light waves travel through the biological specimen, the light wave amplitude (i.e., brightness) and phase change in a manner dependent on properties of the biological specimen. As a result, a phase contrast image has brightness intensity values associated with pixels that vary such that denser regions with a high refractive index are rendered darker in the resulting image and thinner regions with a lower refractive index are rendered lighter in the resulting image. Phase contrast images can be generated via a number of techniques, including from a Z-stack of brightfield images.

As used herein, a "Z-stack" or "Z-sweep" of brightfield images refers to a digital image processing method which combines multiple images taken at different focal distances to provide a composite image with a greater depth of field (i.e. the thickness of the plane of focus) than any of the individual source brightfield images.

As used herein, a "focal plane" refers to a plane arranged perpendicular to an axis of an optical microscope's lens at which a biological specimen is observable at optimal focus.

As used herein, a "defocusing distance" refers to a distance above or below the focal plane such that the biological specimen is observable out of focus.

As used herein, a "confluence mask" refers to a binary image in which pixels are identified as belonging to the one or more cells in the biological specimen such that pixels corresponding to the one or more cells are assigned a value of 1 and the remaining pixels corresponding to background are assigned a value of 0 or vice versa.

As used herein, a "cell image" refers to an image generated based on at least two brightfield images obtained at different planes to enhance cell contrast relative to the background.

As used herein, a "seed mask" refers to an image having a binary pixelation generated based on a set pixel intensity threshold.

As used herein, a "cell-by-cell segmentation mask" refers to an image having binary pixelation (i.e., each pixel is assigned a value of 0 or 1 by the processor) such that the cells of the biological specimen 110 are each displayed as a distinct region-of-interest. The cell-by-cell segmentation mask may advantageously permit label-free counting of cells displayed therein, permit determination of the entire area of individual adherent cells, permit analysis based on cell texture metrics and cell shape descriptors, and/or permit detection of individual cell boundaries, including for adherent cells that tend to be formed in sheets, where each cell may contact a number of other adjacent cells in the biological specimen 110.

As used herein, "region-growing iteration" refers to a single step in an iterative image segmentation method by which regions-of-interest ("ROIs") are defined by taking one or more initially identified individual or sets of pixels (i.e., "seeds") and iteratively expanding that seed by adding neighboring pixels to the set. The processor utilizes similarity metrics to determine which pixels are added to the growing region and stopping criteria are defined for the processor to determine when the region growing is complete.

As used herein, a "trained model" refers to a model for prediction and/or classification (e.g., an artificial neural network, a Bayesian predictor, a decision tree) whose parameters (e.g., weights, filter bank coefficients), structure (e.g., number of hidden layers and/or units, pattern of interconnection of such units), or other properties of configuration have been trained (e.g., by reinforcement learning, by gradient descent, by analytically determining maximum likelihood values of model parameters), based on a set of training data, to generate an output that is predictive for the class membership of a cell (e.g., alive/dead, differentiated/undifferentiated).

Figure 4:
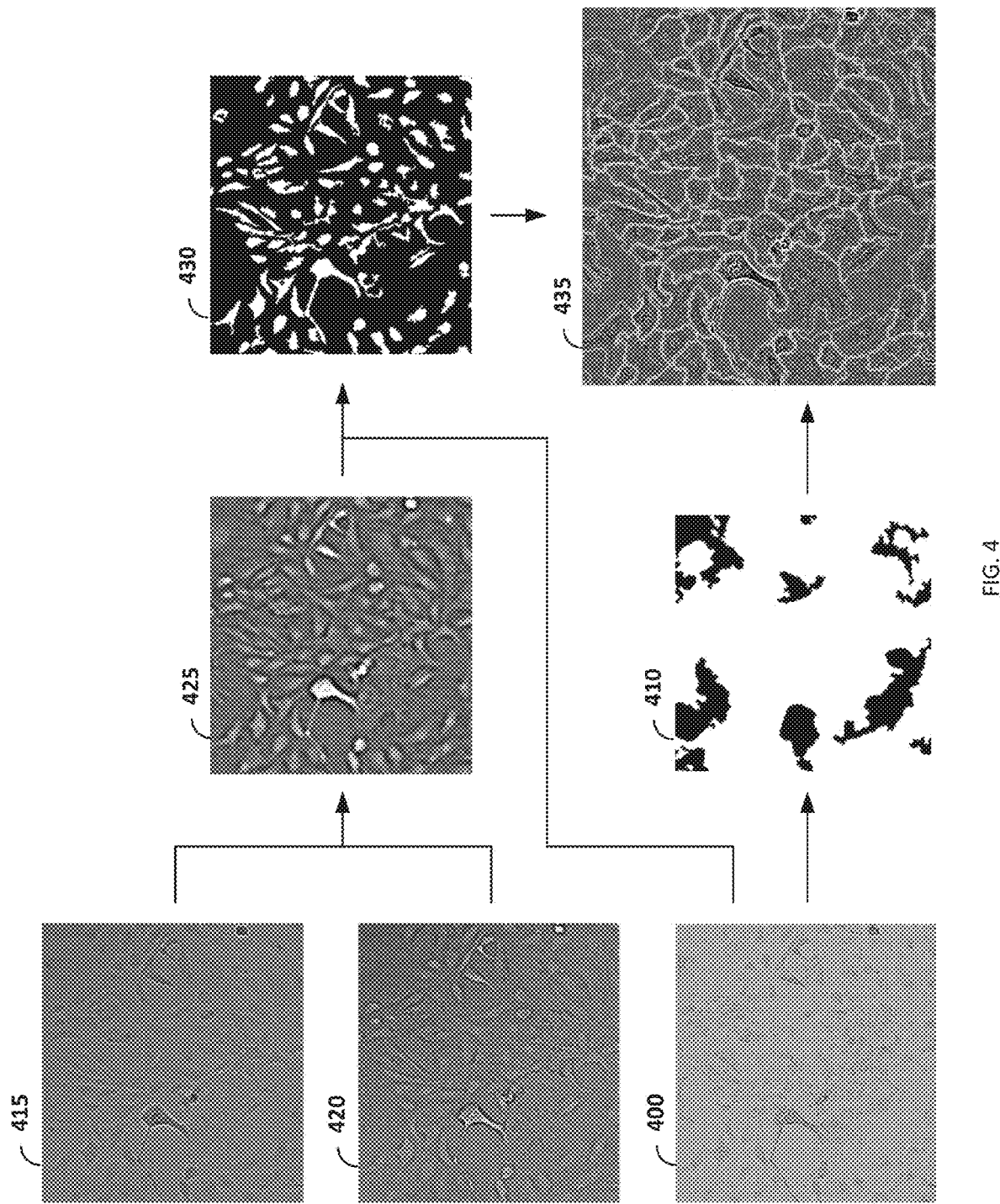
FIG. 4 shows images of a biological specimen, according to an example implementation.
Figure 5:
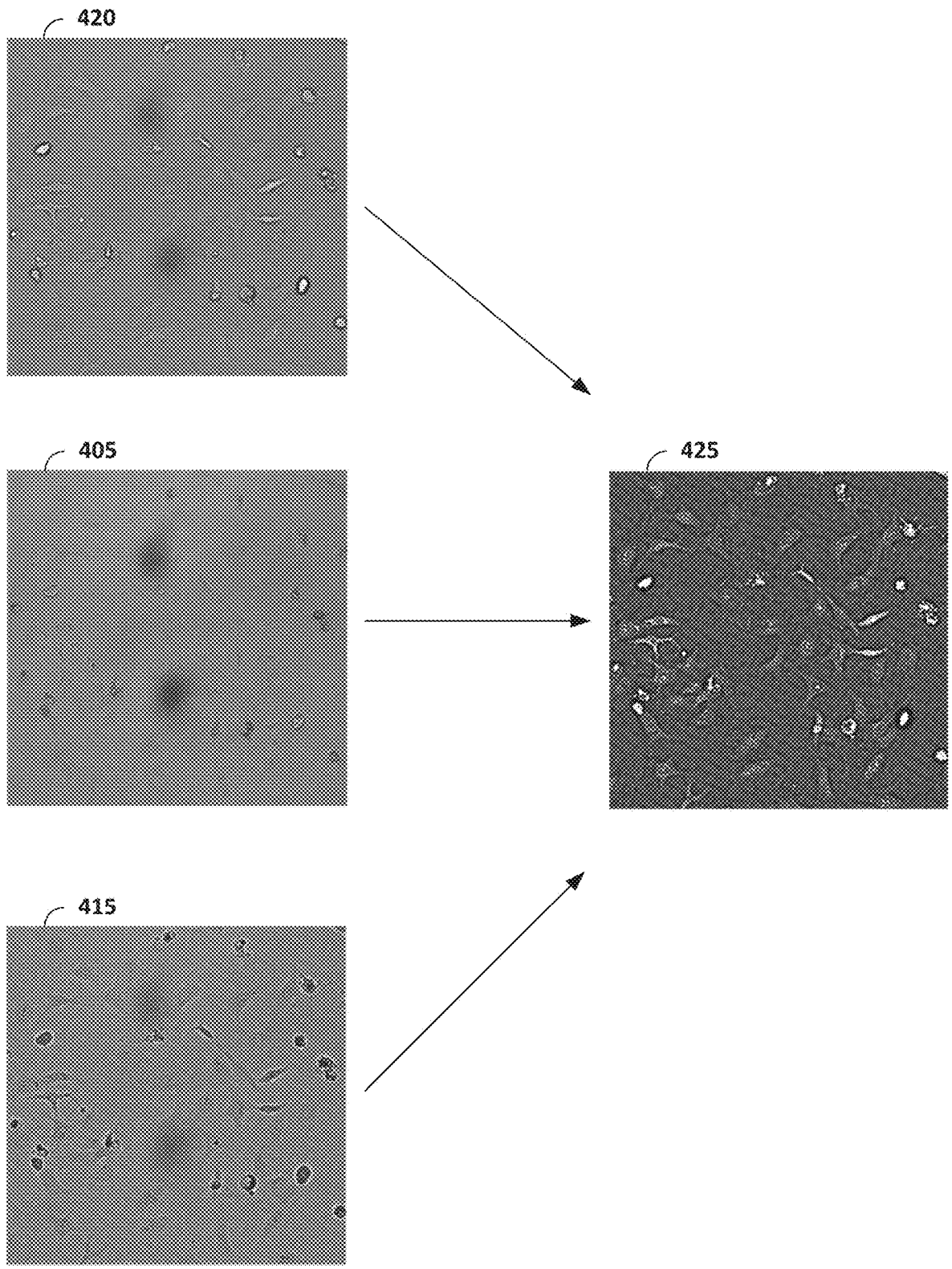
FIG. 5 shows images of another biological specimen, according to an example implementation.

Referring now to FIGS. 3-5, a method 300 is illustrated using the computing device of FIGS. 1-2. Method 300 includes, at block 305, a processor 202 generating at least one phase contrast image 400 of a biological specimen 110 comprising one or more cells centered around a focal plane for the biological specimen 110. Then, at block 310, the processor 202 generates a confluence mask 410 in the form of a binary image based on the at least one phase contrast image 400. Next, at block 315, the processor 202 receives a first brightfield image 415 of one or more cells in the biological specimen 110 at a defocusing distance above the focal plane and a second brightfield image 420 of the one or more cells in the biological specimen 110 at the defocusing distance below the focal plane. The processor 202 then generates a cell image 425 of the one or more cells in the biological specimen based on the first brightfield image 415 and the second brightfield image 420, at block 320. At block 325, the processor 202 generates a seed mask 430 based on the cell image 425 and the at least one phase contrast image 400. And the processor 202 generates an image of the one or more cells in the biological specimen showing a cell-by-cell segmentation mask 435 based on the seed mask 430 and the confluence mask 410, at block 330.

As shown in FIG. 3, at block 305, the processor 202 generating at least one phase contrast image 400 of the biological specimen 110 comprising one or more cells centered around the focal plane for the biological specimen 110 includes the processor 202 both receiving a Z-sweep of brightfield images and then generating the at least one phase contrast image 400 based on the Z-sweep of brightfield images. In various embodiments, the biological specimen 110 may be dispersed within a plurality of wells in a well plate representing an experimental set.

In one optional embodiment, method 100 includes the processor 202 both receiving at least one fluorescent image and then calculating a fluorescent intensity of the one or more cells in the biological specimen 110 within the cell-by-cell segmentation mask 435. In this embodiment, the fluorescent intensity corresponds to the level of a protein of interest, e.g. antibodies that label a cell surface marker like CD20 or an annexin-V reagent that induces fluorescence corresponding to cell death. In addition, determining fluorescent intensity within individual cell boundaries may increase subpopulation identification and permit calculation of subpopulation-specific metrics (e.g., an average area and eccentricity of all dying cells, as defined by the presence of annexin-V).

In another embodiment, at block 310, the processor 202 generating the confluence mask 410 in the form of the binary image based on the at least one phase contrast image 400 includes the processor 202 applying one or more of a local texture filter or a brightness filter to enable identification of pixels belonging to the one or more cells in the biological specimen 110. Example filters can include, but are not limited to local range filters, local entropy filters, local standard deviation filters, local brightness filters and Gabor wavelet filters. Example confluence masks 410, are shown in FIGS. 4 and 5.

In another optional embodiment, the optical microscope 105 determines the focal plane of the biological specimen 110. In addition, in various embodiments, the defocusing distance may range from 20 pm to 60 p.m. The optimal defocusing distance is determined based on the optical properties of the objective used, including the magnification and working distance of the objective.

In a further embodiment shown in FIG. 5, at block 320, the processor 202 generating the cell image 425 based on the first brightfield image 415 and the second brightfield image 420 includes the processor 202 enhancing the first brightfield image 415 and the second brightfield image 420 based on a third brightfield image 405 that is centered around the focal plane utilizing at least one of a plurality of pixel-wise mathematical operations or feature detection. One example of a pixel-wise mathematical operation includes addition, subtraction, multiplication, division or any combination of these operations. Then, the processor 202 calculates transform parameters to align the first brightfield image 415 and the second brightfield image 420 with the at least one phase contrast image 400. Next, the processor 202 combines brightness levels for each pixel of the aligned second brightfield image 420 by a brightness level of corresponding pixels in the aligned first brightfield image 415 to thereby form the cell image 425. The combination of brightness levels for each pixel can be achieved via any of the mathematical operations described above. The technical effect of generating the cell image 425 is to remove brightfield artefacts (e.g., shadows) and enhance image contrast to increase cell detection for the seed mask 430.

In another optional embodiment, at block 320, the processor 202 generating the cell image 425 of the one or more cells in the biological specimen 110 based on the first brightfield image 415 and the second brightfield image 420 includes the processor 202 receiving one or more user-defined parameters that determine one or more threshold levels and one or more filter sizes. The processor 202 then applies one or more smoothing filters to the cell image 425 based on the one or more user-defined parameters. The technical effect of the smoothing filters is to further increase accuracy of cell detection in the seed mask 430 and increase the likelihood that one seed will be assigned per cell. Smoothing filter parameters are chosen to adapt to different adherent cell morphologies, for example, flat versus rounded shape, protrusive cells, clustered cells, etc.

In a further optional embodiment, at block 325, the processor 202 generating the seed mask 430 based on the cell image 425 and the at least one phase contrast image 400 includes the processor 202 modifying the cell image 425 such that each pixel at or above a threshold pixel intensity is identified as a cell seed pixel, thereby resulting in the seed mask 430 having a binary pixelation. The technical effect of the seed mask's binary pixelation is to permit comparison with the corresponding binary pixelation of the confluence mask. The seed mask's binary pixelation is also utilized as a starting point for the region-growing iteration discussed below. For example, in yet another optional embodiment, the seed mask 430 may have a plurality of seeds that each correspond to a single cell in the biological specimen 110. In this embodiment, method 300 further includes, prior to the processor 202 generating the image of the one or more cells in the biological specimen showing the cell-by-cell segmentation mask 435, the processor 202 comparing the seed mask 430 and the confluence mask 410 and eliminating one or more regions from the seed mask 430 that are not arranged in an area of the confluence mask 410 and eliminating one or more regions from the confluence mask 410 that do not contain one of the plurality of seeds of the seed mask 430. The technical effect of these eliminated regions is to exclude small bright objects (e.g., cell debris) that generate a seed and to increase identification of seeds utilized in the region-growing iteration described below.

In a further optional embodiment, at block 330, the processor 202 generating the image of the one or more cells in the biological specimen 110 showing the cell-by-cell segmentation mask 435 based on the seed mask 430 and the confluence mask 410 includes the processor 202 performing a region-growing iteration for each of an active set of seeds. The processor 202 then repeats the region-growing iteration for each seed in the active set of seeds until a growing region for a given seed reaches one or more borders of the confluence mask 410 or overlaps with a growing region of another seed. The active set of seeds is selected by the processor 202 for each iteration based on properties of the corresponding pixels' values in the cell image. In addition, the technical effect of using at least one phase contrast image 400, as well as brightfield images 415, 420, 405, is that the seeds correspond to both a bright spot in the cell image 425 and also areas of high texture in the phase contrast image 400 (i.e., overlap of the confluence mask 410 with the seed mask 430 described in more detail below). Another technical effect that results from using the confluence mask 410, the at least one phase contrast image, as well as brightfield images 415, 420, 405, is increased accuracy in the identification of individual cell locations and cell boundaries in the cell-by-cell segmentation mask 435 that advantageously permits quantifying features like cell surface protein expression, as one example.

In still another optional embodiment, method 300 may include the processor 202 applying one or more filters in response to user input to remove objects based on one or more cell texture metrics and cell shape descriptors. The processor 202 then modifies the image of the biological specimen showing the cell-by-cell segmentation mask in response to application of the one or more filters. Example cell texture metrics and cell shape descriptors include, but are not limited to, a cell's size, perimeter, eccentricity, fluorescent intensity, aspect ratio, solidity, Feret's diameter, phase contrast entropy and phase contrast standard deviation.

In a further optional embodiment, the method 300 may include the processor 202 determining a cell count for the biological specimen 110 based on the image of the one or more cells in the biological specimen 110 showing the cell-by-cell segmentation mask 435. The foregoing cell count is advantageously permitted as a result of defined cell boundaries shown in the cell-by-cell segmentation mask 435, shown for example in FIG. 4. In one optional embodiment, the one or more cells in the biological specimen 110 are one or more of adherent cells and non-adherent cells. In a further embodiment, the adherent cells may include one or more of various cancer cell lines, including human lung carcinoma cells, fibrocarcinoma cells, breast cancer cells, ovarian cancer cells, or human microvascular cell lines, including human umbilical vein cells. In an optional embodiment, the processor 202 performs the region-growing iteration in such a way that different smoothing filters are applied to non-adherent cells, including human immune cells like PMBCs and Jurkat cells, than are applied to adherent cells to improve approximation of cell boundaries.

As one example, a non-transitory computer-readable medium having stored thereon program instructions that upon execution by a processor 202, cause performance of a set of acts that include the processor 202 generating at least one phase contrast image 400 of a biological specimen 110 comprising one or more cells based on at least one brightfield image 405 centered around a focal plane for the biological specimen 110. The processor 202 then generates a confluence mask 410 in the form of a binary image based on the at least one phase contrast image 400. Next, the processor 202 receives a first brightfield image 415 of one or more cells in the biological specimen 110 at a defocusing distance above the focal plane and a second brightfield image 420 of the one or more cells in the biological specimen 110 at the defocusing distance below the focal plane. The processor 202 then generates a cell image 425 of the one or more cells based on the first brightfield image 415 and the second brightfield image 420. The processor 202 also generates a seed mask 430 based on the cell image 425 and the at least one phase contrast image 400. And the processor 202 generates an image of the one or more cells in the biological specimen 100 showing a cell-by-cell segmentation mask 435 based on the seed mask 430 and the confluence mask 410.

In one optional embodiment, the non-transitory computer-readable medium further includes the processor 202 receiving at least one fluorescent image and the processor 202 calculating a fluorescent intensity of the one or more cells in the biological specimen within the cell-by-cell segmentation mask.

In another optional embodiment, the non-transitory computer-readable medium further includes the processor 202 generating the seed mask 430 based on the cell image 425 and the at least one phase contrast image 400. And the non-transitory computer-readable medium further includes the processor 202 modifying the cell image 410 such that each pixel at or above a threshold pixel intensity is identified as a cell seed pixel, thereby resulting in the seed mask 430 having a binary pixelation.

In a further optional embodiment, the seed mask 430 has a plurality of seeds that each correspond to a single cell. And the non-transitory computer-readable medium further includes, prior to the processor 202 generating the image of the one or more cells in the biological specimen 110 showing the cell-by-cell segmentation mask 435, the processor 202 comparing the seed mask 430 and the confluence mask 410 and eliminating one or more regions from the seed mask 430 that are not arranged in an area of the confluence mask 410 and eliminating one or more regions from the confluence mask 410 that do not contain one of the plurality of seeds of the seed mask 430.

In yet another optional embodiment, the program instruction causing the processor 202 to generate the image of the one or more cells in the biological specimen 110 showing the cell-by-cell segmentation mask 435 based on the seed mask 430 and the confluence mask 410 includes the processor 202 performing a region-growing iteration for each of an active set of seeds. Then, the non-transitory computer-readable medium further includes the processor 202 repeating the region-growing iteration for each seed in the active set of seeds until a growing region for a given seed reaches one or more borders of the confluence mask 410 or overlaps with a growing region of another seed.

The non-transitory computer-readable medium further includes the processor 202 applying one or more filters in response to user input to remove objects based on one or more cell texture metrics and cell shape descriptors. And the processor 202 modifies the image of the biological specimen 110 showing the cell-by-cell segmentation mask 435 in response to application of the one or more filters.

Referring now to FIG. 8, an exemplary method 800 for classification of cells is illustrated using the computing device of FIGS. 1-2. Method 800 includes, at block 805, a processor (e.g., processor 202) obtaining a set of images of a plurality of biological samples, wherein the set of images includes at least one image of each sample of the plurality of biological samples. Then, at block 810, the processor obtains an indication of a first set of cells within the plurality of biological samples and obtaining an indication of a second set of cells within the plurality of biological samples, wherein the first set of cells is associated with a first condition and the second set of cells is associated with a second condition. Next, at block 815, the processor determines, based on the set of images, the indication of the first set of cells, and the indication of the second set of cells, a first plurality of sets of metrics, wherein the first plurality of sets of metrics comprise a set of metrics for each cell of the first set of cells and a set of metrics for each cell of the second set of cells. At block 820, the processor uses a supervised learning algorithm to generate, based on the first plurality of sets of metrics, a model to distinguish between cells in the first set of cells and cells in the second set of cells, thereby generating a trained model. At block 825, the processor determines, based on the set of images, a second plurality of sets of metrics, wherein the second plurality of sets of metrics comprise a set of metrics for each cell present in a target sample. Then, at block 830, the processor classifies a cell in the target sample, wherein classifying the cell comprises applying the trained model to the set of metrics for the cell. The method 800 could include additional steps or features.

Referring now to FIG. 9, another exemplary method 900 for classification of cells is illustrated using the computing device of FIGS. 1-2. Method 900 includes, at block 905, a processor (e.g., processor 202) obtaining three or more images of a target sample, wherein the target sample comprises one or more cells centered around a focal plane for the target sample, wherein the three or more images include a phase contrast image, a first brightfield image, and a second brightfield image, wherein the first brightfield image represents an image of the target sample focused at a first defocusing distance above the focal plane, and wherein the second brightfield image represents an image of the target sample focused at a second defocusing distance below the focal plane. Then, at block 910, the processor determines a cell image of the target sample based on the first and second brightfield images. Next, at block 915, the processor determines a target segmentation map for the target sample based on the cell image and the phase contrast image. At block 920, the processor determines, based on the two or more images of the target sample and the target segmentation map, a set of metrics for each cell present in the target sample. Then at block 925, the processor classifies a cell in the target sample, wherein classifying the cell comprises applying the set of metrics of the cell to a trained classifier. The method 900 could include additional steps or features.

Referring now to FIG. 10, another exemplary method 1000 for classification of cells is illustrated using the computing device of FIGS. 1-2. Method 1000 includes, at block 1005, a processor (e.g., processor 202) obtaining two or more images of a target sample, wherein the target sample comprises one or more cells centered around a focal plane for the target sample, wherein the two or more images include a phase contrast image and one or more brightfield images, wherein the one or more brightfield images includes at least one brightfield image that represents an image of the target sample that is not focused at the focal plane. Then, at block 1010, the processor determines, based on the two or more images, a set of metrics for each cell present in the target sample. Next, at block 1015, the processor classifies a cell in the target sample by applying a trained model to the set of metrics for the cell. The method 1000 could include additional steps or features.

As discussed above, a non-transitory computer-readable medium having stored thereon program instructions that upon execution by a processor 202 may be utilized to cause performance of any of functions of the foregoing methods.

IV. Experimental Results

Figure 6A:
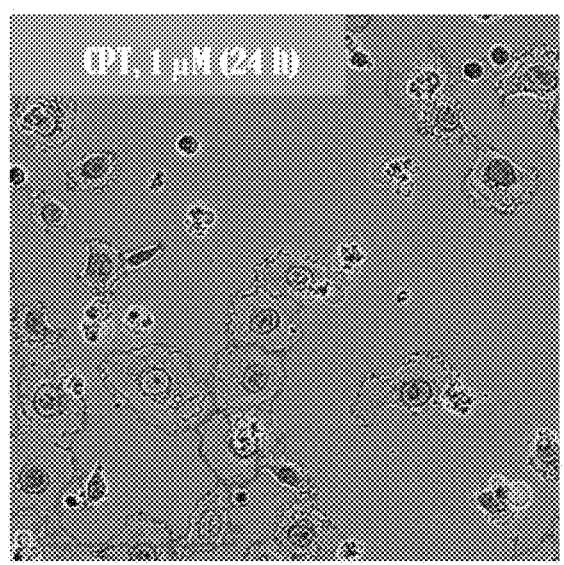
FIG. 6A shows experimental results of a cell-by-cell segmentation mask, generated according to an example implementation, for a cell image response at 24 hours after a time course of HT1080 fibrosarcoma apoptosis following a camptothecin (CPT, cytotoxic) treatment.
Figure 6B:
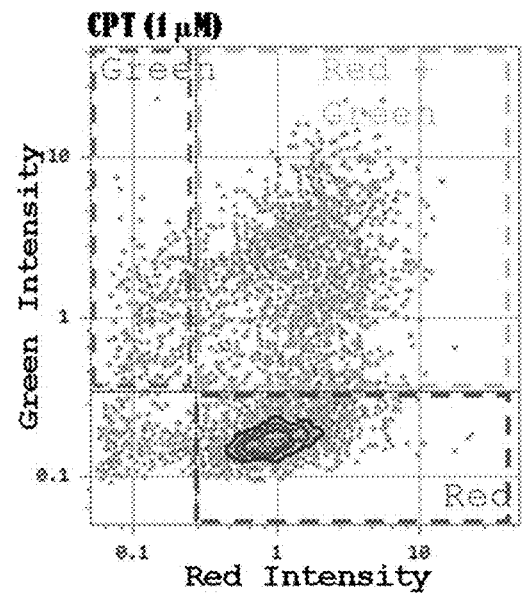
FIG. 6B shows cell subsets classified based on red (Nuclight Red, a cell health indicator, "NucRed") and green fluorescence (Caspase 3/7, an apoptosis indicator), according to the implementation of FIG. 6A.
Figure 6C:
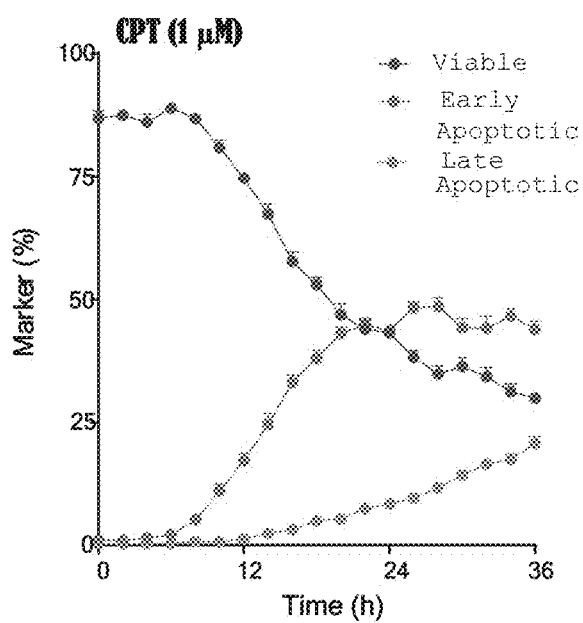
FIG. 6C shows there was a decrease in the red population after CPT treatment indicating loss of viable cells, increasing red and green fluorescence indicating early apoptosis, as well as increasing green fluorescence after 24 hours indicating late apoptosis, according to the implementation of FIG. 6A.
Figure 6D:
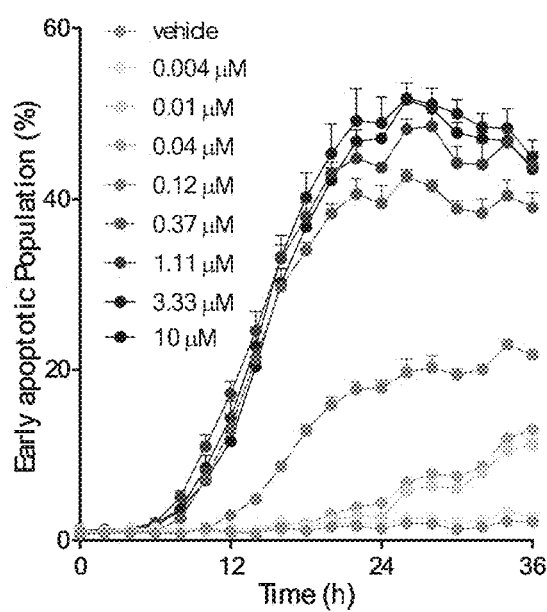
FIG. 6D shows concentration response time courses of the early apoptotic population (percentage of total cells exhibiting red and green fluorescence), according to the implementation of FIG. 6A.

Example implementations permit cell health to be tracked in sub-populations over time. For example, FIG. 6A shows experimental results of a cell-by-cell segmentation mask, generated according to an example implementation, for a phase contrast image response at 24 hours after a time course of HT1080 fibrosarcoma apoptosis following a camptothecin (CPT, cytotoxic) treatment. Cell health was determined with multiplexed readouts of Incucyte® NucLight Red (nuclear viability marker) and non-perturbing Incucyte® Caspase 3/7 Green Reagent (apoptotic indicator). FIG. 6B shows cell subsets classified based on red and green fluorescence, according to the implementation of FIG. 6A, using Incucyte® Cell-by-Cell Analysis Software tools. FIG. 6C shows there was a decrease in the red population after CPT treatment indicating loss of viable cells, increasing red and green fluorescence indicating early apoptosis, as well as increasing green fluorescence after 24 hours indicating late apoptosis, according to the implementation of FIG. 6A. FIG. 6D shows concentration response time courses of the early apoptotic population (percentage of total cells exhibiting red and green fluorescence), according to the implementation of FIG. 6A. Values shown are the mean±SEM of 3 wells.

In another example, FIG. 6E shows experimental results of a cell-by-cell segmentation mask, generated according to an example implementation, for a cell image response at 24 hours after a time course of HT1080 fibrosarcoma apoptosis following a cyclohexamide (CHX, cytostatic) treatment. Cell health was determined with multiplexed readouts of Incucyte® NucLight Red (nuclear viability marker) and non-perturbing Incucyte® Caspase 3/7 Green Reagent (apoptotic indicator). FIG. 6F shows cell subsets classified based on red and green fluorescence, according to the implementation of FIG. 6E, using Incucyte® Cell-by-Cell Analysis Software tools. FIG. 6G shows there was a lack of apoptosis but a decrease in cell counts after CHX treatment (data not shown), according to the implementation of FIG. 6E. FIG. 6H shows concentration response time courses of the early apoptotic population (percentage of total cells exhibiting red and green fluorescence), according to the implementation of FIG. 6E. Values shown are the mean±SEM of 3 wells.

FIG. 7A shows a cell-by cell segmentation mask imposed over a phase contrast image for label-free cell counting of adherent cells using cell-by-cell segmentation analysis, generated according to an example implementation via Incucyte® software. Various densities of A549 Cells labelled with NucLight Red reagent were analyzed with both the label-free cell-by-cell analysis and with the red nuclear count analysis to validate the label-free counting over time. FIG. 7B shows the cell-by-cell segmentation mask according to FIG. 7A without the phase contrast image in the background. FIG. 7C shows a time course of phase count and red count data across densities, according to the implementation of FIG. 7A. FIG. 7D shows a correlation of count data over 48 hours and demonstrates R2 value of 1 with a slope of 1, according to the implementation of FIG. 7A. This has been repeated across a range of cell types. Values shown are the mean±SEM of 4 wells.

V. Example Classification of Cells

Algorithmic classification of cells, based on images of samples containing the cells, can facilitate a variety of applications. This can include quantifying properties of the cells and/or cells samples, quantifying the response of the cell samples to applied experimental conditions (e.g., the toxicity or effectiveness of a putative drug or treatment), or assessing some other information about the samples. Classification of the cells facilitates such applications by allowing the number of cells of each class within a sample to be determined. Such classifications may include two-class classifications or classification into more than two classes. In some examples of classifications, cells may be classified as alive or dead, as a stem cell or a mature cell, as an undifferentiated cell or as a differentiated cell, as a wildtype cell or a mutant cell, epithelial or mesenchymal, normal or morphologically altered by an applied compound (e.g., altered by application of a cytoskeleton-targeting treatment compound), or between two or more additional or alternative classifications. Cells may also be assigned multiple classes, selected from respective multiple different enumerated sets of classes. For example, a cell could be classified as alive (from possible classes of 'alive' and 'dead') and as differentiated (from possible classes of 'differentiated' and 'undifferentiated').

Embodiments described herein accomplish classification of a particular cell by determining a set of metrics for the cell. The set of metrics is determined from one or more microscopic images of the cell. Of particular utility in determining such metrics are one or more defocused brightfield images of the cell, or composite images determined therefrom and/or in combination with phase contrast images of the cell. For example, one or more metrics for a cell could be determined from each of a phase contrast image of the cell and a cell image (determined as described above) of the cell. The determination of the set of metrics generally includes segmenting the image(s) in order to determine what portion of the image(s) corresponds to the cell. The segmentation itself is determined based on one or more of the images as described elsewhere herein. Further, the segmentation may be used to determine one or more of the metrics (e.g., the size of the cell, one or more metrics related to the shape of the cell, etc.). The set of metrics is then applied to a model in order to classify the cell.

Figure 11:
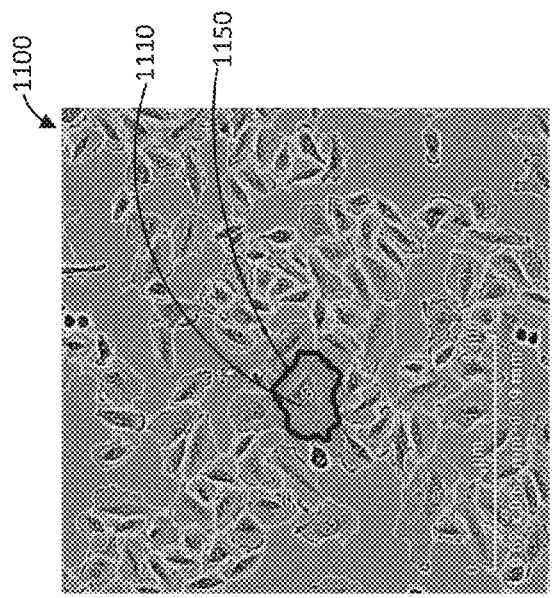
FIG. 11 shows an example microscopic image and a related example segmentation map.

FIG. 11 depicts an example cell-by-cell segmentation mask (bright lines) imposed over a phase contrast image 1100 of a biological sample that includes a number of cells, including an example cell 1110. The cell-by-cell segmentation mask delineates the portion of the phase contrast image 1100 that corresponds to the cell 1110; this is indicated by the dark line 1150 that indicates the portion of the cell-by-cell segmentation mask corresponding to the example cell 1110. The portion of the phase contrast image 1100 within the dark line 1150 can be used to determine one or more metrics for the example cell 1110 (e.g., texture-related metric(s), intensity-related metric(s)), as can the portion 1150 of the cell-by-cell segmentation mask that delineates the example cell 1110 (e.g., size-related metric(s), shape-related metric(s)).

The segmentation of one or more microscopic images of a biological sample to localize cells within that sample may be accomplished using one or more of the methods described above. Additionally or alternatively, one or more microscopic images of the sample could be applied to a convolutional neural network that has been trained to generate such a segmentation map. This could include applying a phase contrast image and a cell image of a sample.

The segmentation map can be used to determine a size metric for the cell. This can include using the segmentation map to determine an area of the cell, a number of pixels of an image that are occupied by the cell, a percent of the pixels and/or area of an image that is occupied by the cell, a length of a perimeter of the cell, a maximal Feret diameter of the cell, or some other metric related to the size of the cell.

The segmentation map can also be used to determine one or more shape descriptor metrics for the cell. Such shape descriptor metrics can a degree of circularity of the cell, a degree of roundness of a convex hull of the cell, or a proportion of the convex hull of the cell that is occupied by the cell, the aspect ratio of a cell (i.e., the ratio of the cell's maximal length to its orthogonal axis), the geographical centroid of the cell, the intensity-weighted centroid of the cell or the difference between those two centroids, or some other metric related to the cell shape.

Additional metrics can include metrics related to the texture and/or intensity of the cell, as depicted in one or more microscopic images of the cell. Such microscopic images of the cell could include phase contrast images, brightfield images, fluorescence images, or other images of the cell. The images could include composite images. Such composite images could include a cell image generated, as described above, from two or more brightfield images focused at respective different planes relative to the cell contents of a biological sample. Another example composite image is a composite of a phase contrast image and one or more brightfield images (e.g., a composite of a phase contrast image and a cell image). Determining such a texture or intensity-based metrics can include determining the metric based on pixels of the image(s) that correspond to a particular cell according to a segmentation map.

Texture metrics may be determined from variation and/or texture across the set of pixels that represents a cell. This can include calculating one or more metrics on a neighborhood basis, e.g., for a given pixel, a texture value could be determined based on the set of pixels that surrounds the given pixel within a specified distance. Such neighborhood texture values could then be averaged across the pixels for a cell to result in an overall texture value for the cell. Such texture values may include a range value that is the difference between the maximal and minimal intensity values within the set of pixels, a variance or standard deviation, an entropy, a contrast value that is a measure of the local variations present in the set of pixels, a homogeneity value that is the measure of uniformity in the set of pixels, and/or some texture-based measurement(s).

Intensity-based metrics can include a mean brightness of the cell in an image, a standard deviation of the brightness of the cell in an image, a minimum of the brightness of the cell in an image, a maximum of the brightness of the cell in an image, a brightness of a specified percentile of pixels of the cells in an image, a kurtosis or skewness measurement of the distribution of brightness values across the cell in an image, or some other metric based on the intensity, or the variation thereof, of the cell in one or more images.

Once a set of metrics has been determined for a particular cell, the set of metrics can be used to classify the cell. This can include applying the set of metrics to a trained model. Such a model could include one or more of a principal components analysis, an independent components analysis, a support vector machine, an artificial neural network, a lookup table, a regression tree, an ensemble of regression trees, a decision tree, an ensemble of decision trees, a k-nearest neighbors analysis, a Bayesian inference, or a logistic regression.

The output of the model could be a simple indication of the determined class of the cell whose set of metrics was applied to the model. Alternatively, the model could output one or more values that are indicative of the class of the cell. Such a value could then be compared to a threshold in order to classify the cell. For example, if the model output value is greater than a threshold the cell could be classified as 'alive,' while if the model output value is less than the threshold the cell could be classified as 'dead.' The value of such a threshold could be determined by an algorithm, e.g., as part of a process of training the model based on training data. Additionally or alternatively, the threshold could be set by a user. For example, the user could adjust the threshold based on visual feedback that indicates, within one or more microscopic images, the classification of cells in the image(s). The user could adjust the threshold after an initial threshold is generated via an algorithmic process.

Figure 12A:
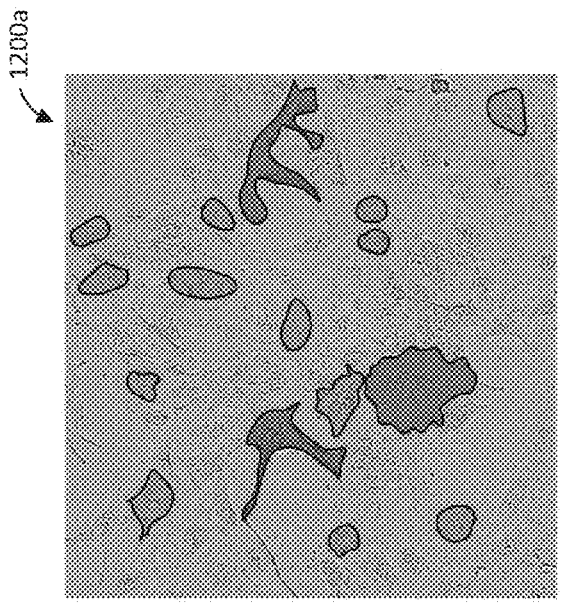
FIG. 12A shows an example annotated microscopic image.
Figure 12B:
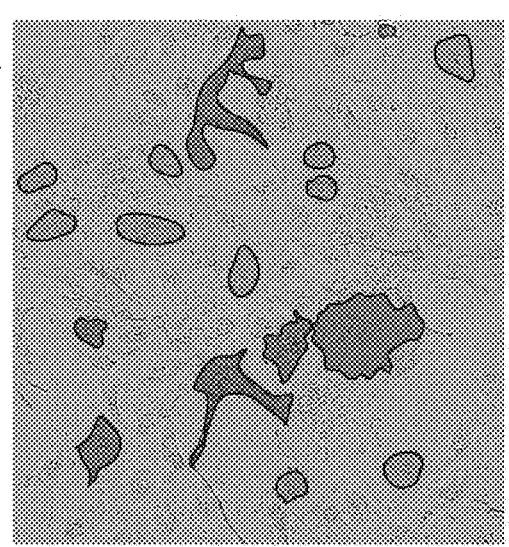
FIG. 12B shows an example annotated microscopic image.

FIGS. 12A and 12B illustrate an example of a substantially real-time or otherwise iterative process of a user adjusting the threshold value and receiving visual feedback regarding the effects of the adjustment on the classification of cells in a biological sample. FIG. 12A depicts elements of an example user interface during a first period of time. The example user interface includes a first annotated image 1200a (e.g., an annotated phase contrast image) of a biological sample. The first annotated image 1200a is annotated to indicate the cells in the sample and to indicate the classification of the cells according to a first value of a threshold. As shown in FIG. 12A, a first class of cells are indicated by red coloration and a second class of cells are indicated by blue coloration.

The threshold can then be updated by a user input to a second value. Such an input could include the user pressing a real or virtual button to increment or decrement the value of the threshold, the user operating a keypad or other means to input a value for the threshold, the user moving a slider or dial to adjust the value for the threshold, or the user engaging in some other user input action to adjust the threshold to the second value. The second value of the threshold is then applied to re-classify the cells in the sample. This re-classification is then visually provided to the user in the form of an updated second annotated image 1200b of the biological sample, shown in FIG. 12B. The second annotated image 1200b is annotated to indicate the cells in the sample and to indicate the classification of the cells according to the updated second value of the threshold. The classification of some of the cells changed with the adjustment of the threshold, and so the second annotated image 1200b reflects this change. Such an update process could be performed a plurality of times. For example, the updating process could be performed at a rate of once per 20 milliseconds or at some other rate to approximate real-time updating of the cell classifications as a result of the user adjusting the threshold value.

Models used to classify cells can be trained using supervised training methods and a suitable training dataset. The training dataset includes a set of metrics determined for each cell in two or more groups of training cells. Each of the groups of training cells corresponds to a respective class or set of classes that the model can be trained to distinguish. The sets of metrics in the training dataset can be determined as described above, by determining the set of metrics for a particular training cell in a particular group based on one or more microscopic images of the particular training cell.

In some examples, the training cells could be disposed within wells of the same multi-well sample plate that contains target cells to be classified based on the training cells. This has the advantage of training the model on training cells that have been exposed to the same or similar environmental or other conditions as the target cells without requiring manual annotation of large numbers of individual cells. Alternatively, the training cells could be disposed in wells of a first multi-well sample plate and the target cells could be disposed in well(s) of a second, different multi-cell sample plate. Such first and second multi-well sample plates could be incubated in the same incubator or otherwise exposed to the same or similar environmental conditions.

The variety of image(s) and/or metrics used to train the model could be the same as or could differ from the variety of image(s) and/or metrics applied to the trained model to classify unknown cells. For example, a fluorescent marker could be present in the biological sample(s) that contain the training cells, but could be absent from samples containing unknown target cells to be classified. This could allow for improved training of the model while avoiding the complication or confounding nature of adding the fluorescent marker to a target sample. Additionally or alternatively, the fluorescent marker could be used to assign training cells into respective groups prior to training a model.

Training cells in the two (or more) groups of training cells could be identified in a variety of ways. In some examples, the groups of training cells could be manually identified by a user. This could include the user manually indicating individual cells for each of the two or more groups. Such an indication could be performed using a user interface that depicts images of the cells within a biological sample, with or without the images having been segmented already. Additionally or alternatively, the user could manually indicate whole wells of a multi-well sample plate as corresponding to respective classes for training. Any cells detected in a well indicated in such a manner would be assigned to the corresponding class to train the model. The user could indicate such wells based on knowledge about the conditions of the wells. For example, a particular well could include a substance that induces cell death and the user could then indicate such a well as containing cells belonging to the 'dead' class for training a model. Indicating groups of training cells in such a well-by-well manner has the advantage of requiring a relatively low amount of user time and effort (e.g., relative to the user indicating individual cells for training).

Figure 13:
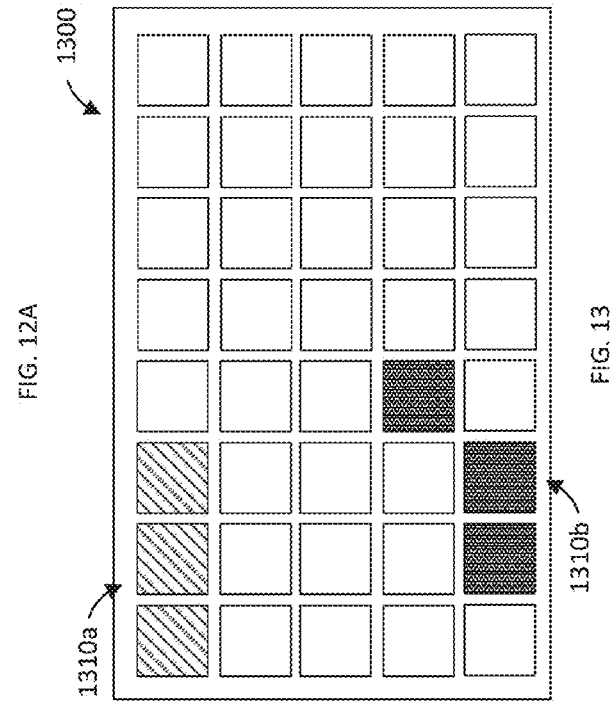
FIG. 13 shows an example schematic representation of wells of a multi-well sample plate.

FIG. 13 depicts elements of an example user interface 1300 that could be used by a user to indicate one or more wells of a multi-well sample plate as corresponding to one of two or more classes that a model can then be trained to distinguish. The user interface 1300 depicts the relative locations of the wells of the multi-well sample plate, with each well represented by a respective square. Additional information about each well could be provided. Such additional information could include information about the contents of the wells, conditions applied to the wells, images of the contents of the wells, or some other information. The user could then indicate sets of the wells as corresponding to respective classes. As shown, a user has indicated a first set of wells 1310a as corresponding to a first class (e.g., an 'alive' class) and a second set of wells 1310b as corresponding to a second class (e.g., a 'dead' class).

Note that indication of sets of cells (e.g., by indicating individual cells, by indicating whole wells of a multi-well sample plate, by indicating the cells in concert with an automated or semi-automated method) can include indicating the cells at one or more specified points in time. For example, indicating a first set of cells could include indicating a well at a first point in time (e.g., when all or most of the cells in the well are alive, to indicate a set of alive cells) and indicating a second set of cells could include indicating the same well at a second point in time (e.g., when all or most of the cells in the well are dead, to indicate a set of dead cells).

The indicated sets of cells, or the sets of metrics determined therefrom, can be filtered or otherwise modified prior to using the resulting training data to train a model. This could be done in order to reduce the time or number of iterations required to fit the data, to result in a more accurate model without overfitting the training data, or to otherwise improve the trained model and/or the process of training the model. Such filtering or other pre-processing steps could include synthetically balancing the training sets of cells, subsampling the training sets of cells, and/or normalizing the values of the determined metrics (e.g., normalizing each determined metric such that the population of values of the metric, across all cells in the training data, occupied a standard range and/or comported with a specified distribution).

Additionally or alternatively, the groups of training cells could be identified by an algorithm or otherwise automatically or semi-automatically identified. This could include using the presence or absence of a fluorescent marker to identify groups of training cells. This could include obtaining fluorescent images of biological samples that contain the fluorescent marker and, based on the fluorescent images, identifying first and second groups of cells in the sample according to whether the cells have a mean fluorescence intensity greater or lesser, respectively, than a threshold level.

In another example, an unsupervised training process could be used to classify cells in training images. This could include identifying two or more clusters of cells within the training images. A user could then manually classify a limited number of cells as belonging to respective classes selected from a set of two or more classes. These manually classified cells could be cells that had already been clustered by the unsupervised training process or could be novel cells. The manual classification could then be used to assign the clusters of cells to appropriate classes within the set of two or more classes. The manual classification could be on a cell-by-cell basis, on a whole-well basis, or some other manner of manual classification of cells.

The description of different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

VI. Experimental Classification Results

Classification of cells is improved when using one or more metrics determined from cell images (i.e., composite images determined from two or more defocused brightfield images) of the cells. FIGS. 14A and 14B show the accuracy of classification of cells as alive or dead across a number of samples that were treated with camptothecin (a cytotoxic compound capable of causing cell death, "CMP") or an experimental control compound ("VEH"). FIG. 13A shows the classification based on a set of metrics determined from the cell-by-cell segmentation mask (e.g., area, perimeter) of the samples and the phase contrast images (e.g., phase contrast mean brightness) of the samples. FIG. 13B shows the classification based on the above metrics as well as additional metrics determined from cell images (e.g., cell image mean brightness) of the samples. The overall accuracy, across all of the cells represented in FIGS. 14A and 14B, increased from 0.82 to 0.94, with the F1 statistic increasing from 0.89 to 0.96 (using the alive cells as the 'positive' class).

Figure 15B:
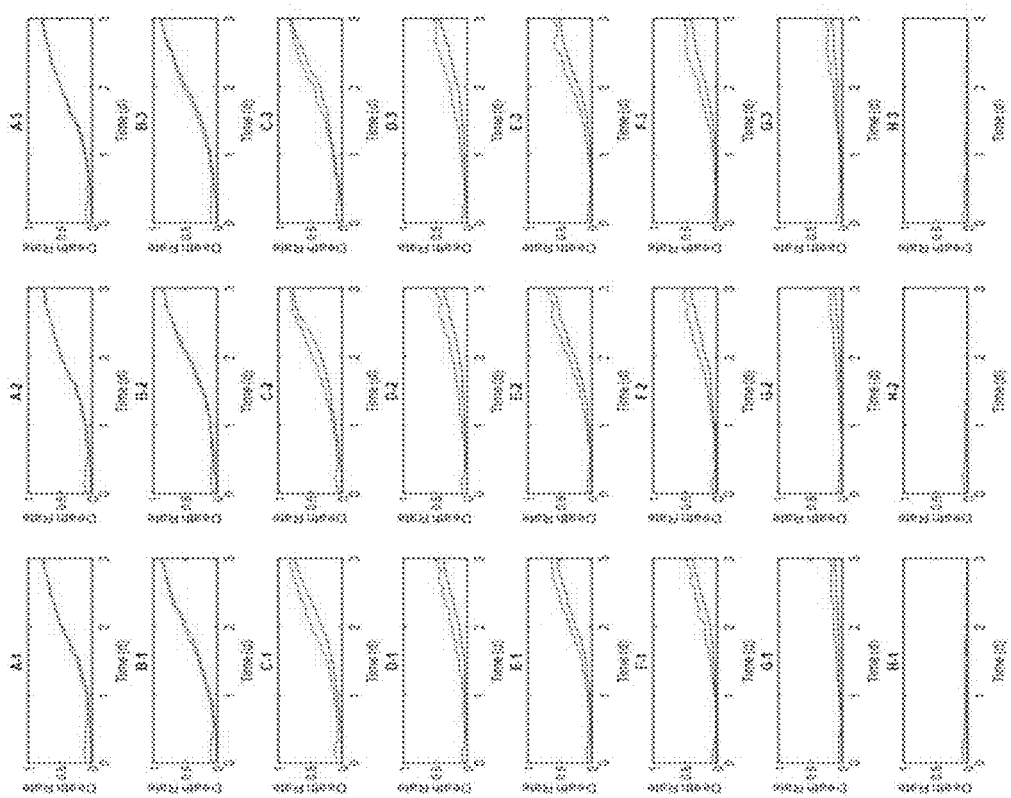
FIGS. 15A and 15B illustrate the experimental predictive accuracy of methods described herein.
Figure 15A:
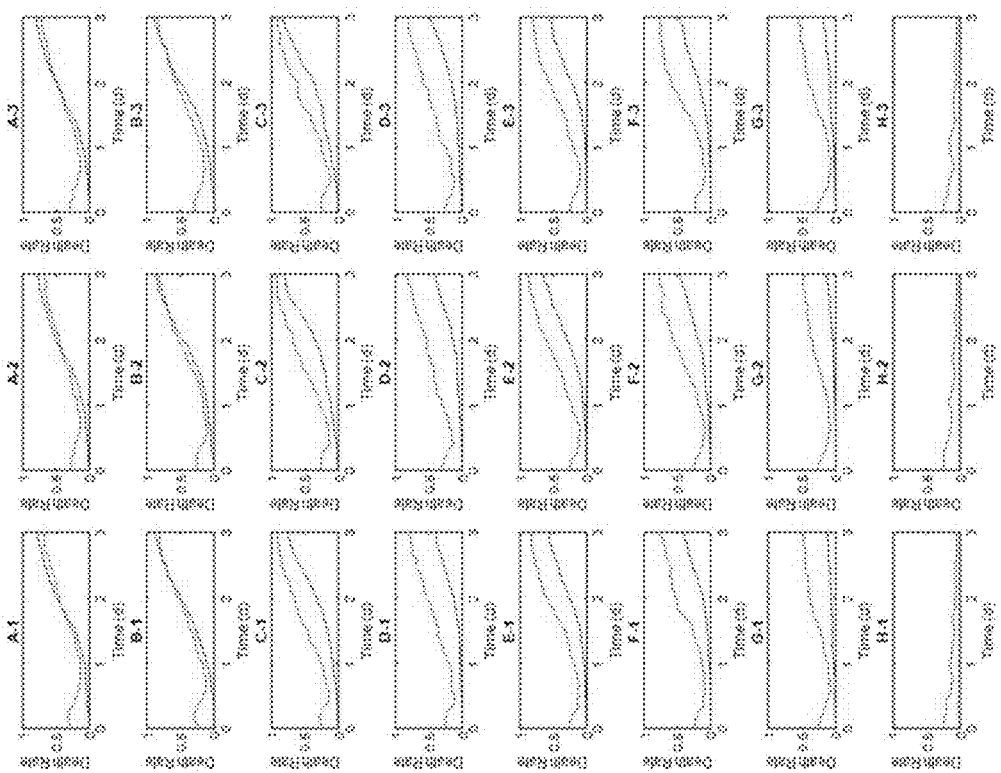

FIGS. 15A and 15B show the effect of this improved accuracy of classification of cells as alive or dead on the determined cell death rate in a number of samples as a function of time. FIG. 15A shows a sample of determined cell death rates over time as determined from the cell-by-cell segmentation mask (e.g., area, perimeter) of the samples and the phase contrast images (e.g., phase contrast mean brightness) of the samples. The red trace is the rate as determined by the trained model, while the blue trace is the true rate. FIG. 15B shows a sample of determined cell death rates over time as determined from a trained model using the above metrics as well as additional metrics determined from cell images (e.g., cell image mean brightness) of the samples.

The classification methods described herein facilitate classification of cells with an accuracy that approximates the accuracy of fluorophore-based methods. This allows for accurate classification without the expense, complexity, or experimental confounding effects that may be associated with the use of fluorescent labels. In an experiment, A549 cells were treated with increasing concentrations of the cytotoxic compound camptothecin (0.1-10 μM) for 72 h in the presence of Annexin V reagent. The cells were classed as Dead or Live based on fluorescence Annexin response (live cells=low fluorescence, dead cells=high fluorescence). The results of the Annexin V-based classification are shown in FIG. 16A. The metric-based methods described herein were used to train a model using label-free features of dead (10 μM, 72 h) and live (vehicle, 0-72 h) cells. This model was then applied to class cells as Live or Dead in order to obtain a % dead cells which was comparable to that of the Annexin V response. The results of this label-free classification are shown in FIG. 16B. FIG. 16C shows an overlay of the concentration response curves of % death at 72h as calculated using Annexin V or label-free methods, showing that the predicted response over the concentration range is comparable, and EC50 values were similar (Annexin V $EC_{50}$=6.6 E-07; Label-free EC50=5.3 E-07 $M^{-1}$).

We claim:

1. A method for classification of cells, the method comprising:
   obtaining a set of images of a plurality of biological samples, wherein the set of images includes at least one image of each sample of the plurality of biological samples;
   obtaining an indication of a first set of cells within the plurality of biological samples and obtaining an indication of a second set of cells within the plurality of biological samples, wherein the first set of cells is associated with a first condition and the second set of cells is associated with a second condition;
   based on the set of images, the indication of the first set of cells, and the indication of the second set of cells, determining a first plurality of sets of metrics, wherein the first plurality of sets of metrics comprise a set of metrics for each cell of the first set of cells and a set of metrics for each cell of the second set of cells;
   based on the first plurality of sets of metrics, using a supervised learning algorithm to generate a model to distinguish between cells in the first set of cells and cells in the second set of cells, thereby generating a trained model;
   based on the set of images, determining a second plurality of sets of metrics, wherein the second plurality of sets of metrics comprise a set of metrics for each cell present in a target sample; and classifying a cell in the target sample, wherein classifying the cell comprises applying the trained model to the set of metrics for the cell, wherein the target sample comprises one or more cells centered around a focal plane for the target sample, and wherein the images of the set of images that depict the target sample include a phase contrast image and one or more brightfield images, wherein the one or more brightfield images includes at least one brightfield image that represents an image of the target sample that is not focused at the focal plane.

2. The method of claim 1, wherein applying the trained model to the set of metrics for the cell comprises generating a model output value based on the set of metrics of the cell, and wherein classifying the cell additionally comprises comparing the model output value to a threshold value.

3. The method of claim 2, further comprising:

displaying an annotated image of the target sample, wherein the annotated image of the target sample includes an indication of the cell and of the classification of the cell;

receiving a user input indicative of an updated threshold value;

re-classifying the cell by comparing the model output value to the updated threshold value; and displaying an updated annotated image of the target sample, wherein the updated annotated image of the target sample includes an indication of the cell and of the re-classification of the cell.

4. The method of claim 1, wherein determining the set of metrics for the cell comprises determining at least one of: a size metric, a shape descriptor metric, a texture metric, or an intensity-based metric.

5. The method of claim 1, wherein the trained model includes at least one of a principal components analysis, an independent components analysis, a support vector machine, an artificial neural network, a lookup table, a regression tree, an ensemble of regression trees, a decision tree, an ensemble of decision trees, a k-nearest neighbors analysis, a Bayesian inference, or a logistic regression.

6. The method of claim 1, wherein the one or more brightfield images include a first brightfield image and a second brightfield image, wherein the first brightfield image represents an image of the target sample focused at a first defocusing distance above the focal plane, wherein the second brightfield image represents an image of the target sample focused at a second defocusing distance below the focal plane, and wherein the method further comprises:

determining a cell image of the target sample based on the first brightfield image and the second brightfield image, wherein determining the set of metrics for the cell comprises determining at least one metric based on the cell image.

7. The method of claim 1, wherein a fluorescent marker is present in cells of the first set of cells and in cells of the second set of cells, and wherein the fluorescent marker is not present in the target sample.

8. The method of claim 1, wherein the first set of cells and the second set of cells are all disposed within wells of a first multi-well sample plate, and wherein the target sample is disposed within a well of a second multi-well sample plate.

9. The method of claim 1, wherein the first set of cells, the second set of cells, and the target sample are all disposed within wells of a multi-well sample plate.

10. The method of claim 9, further comprising:

displaying an indication of locations of wells of the multi-well sample plate, wherein the first set of cells is present in a first set of wells of the multi-well sample plate, wherein the second set of cells is present in a second set of wells of the multi-well sample plate, wherein obtaining the indication of the first set of cells and the indication of the second set of cells comprises, subsequent to displaying the indication, receiving a user input indicative of a first location of the first set of wells and a second location of the second set of wells within the multi-well sample plate.

11. The method of claim 1, further comprising:

prior to generating the trained model, pre-processing the first plurality of sets of metrics by performing at least one of: normalizing at least one metric in the first plurality of sets of metrics, synthetically balancing the first plurality of sets of metrics between the set of metrics for each cell of the first set of cells and the set of metrics for each cell of the second set of cells, and sub-sampling the first plurality of sets of metrics.

12. The method of claim 1, wherein the first set of cells and the second set of cells contain a fluorescent marker, wherein the set of images of the plurality of biological samples comprises at least one fluorescent image depicting the first set of cells and at least one fluorescent image depicting the second set of cells, wherein obtaining the indication of the first set of cells within the plurality of biological samples comprises using the at least one fluorescent image depicting the first set of cells to identify the first set of cells, and wherein obtaining the indication of the second set of cells within the plurality of biological samples comprises using the at least one fluorescent image depicting the second set of cells to identify the second set of cells.

13. The method of claim 1, wherein classifying the cell in the target sample comprises at least one of classifying the cell as alive or dead, classifying the cell as a stem cell or a mature cell, classifying the cell as epithelial or mesenchymal, or classifying the cell as an undifferentiated cell or a differentiated cell.

14. The method of claim 1, wherein each cell present in the target sample is included as part of the plurality of biological samples.

15. A system for assaying biological specimens, the system comprising:

an optical microscope;

a controller, wherein the controller comprises one or more processors; and a non-transitory computer-readable medium, configured to store at least computer-readable instructions that, when executed by the controller, cause the controller to perform controller operations to perform the method of claim 1.

16. A method for classification of cells, the method comprising:

obtaining three or more images of a target sample, wherein the target sample comprises one or more cells centered around a focal plane for the target sample, wherein the three or more images include a phase contrast image, a first brightfield image, and a second brightfield image, wherein the first brightfield image represents an image of the target sample focused at a first defocusing distance above the focal plane, and wherein the second brightfield image represents an image of the target sample focused at a second defocusing distance below the focal plane;

determining a cell image of the target sample based on the first brightfield image and the second brightfield image;

determining a target segmentation map for the target sample based on the cell image and the phase contrast image;

based on the three or more images of the target sample and the target segmentation map, determining a set of metrics for each cell present in the target sample; and classifying a cell in the target sample, wherein classifying the cell comprises applying the set of metrics of the cell to a trained classifier.

17. The method of claim 16, wherein determining the set of metrics for the cell comprises determining at least one of: a size metric, a shape descriptor metric, a texture metric, or an intensity-based metric.

18. The method of claim 16, wherein determining the set of metrics of the cell comprises determining at least one metric of the set of metrics of the cell based on the phase contrast image.

19. The method of claim 16, wherein determining the target segmentation map for the target sample based on the first brightfield image and the second brightfield image comprises applying at least the first brightfield image, the second brightfield image, and the phase contrast image to a convolutional neural network.

20. A method for classification of cells, the method comprising:

obtaining two or more images of a target sample, wherein the target sample comprises one or more cells centered around a focal plane for the target sample, wherein the two or more images include a phase contrast image, a first brightfield image, and a second brightfield image, wherein the first brightfield image represents an image of the target sample focused at a first defocusing distance above the focal plane, wherein the second brightfield image represents an image of the target sample focused at a second defocusing distance below the focal plane;

determining a cell image of the target sample based on the first brightfield image and the second brightfield images;

based on the two or more images, determining a set of metrics for each cell present in the target sample, wherein determining the set of metrics for the cell comprises determining at least one metric based on the cell image; and classifying a cell in the target sample by applying a trained model to the set of metrics for the cell.

21. The method of claim 20, wherein determining the set of metrics for the cell comprises determining at least one of: a size metric, a shape descriptor metric, a texture metric, or an intensity-based metric.

22. A non-transitory computer-readable medium, configured to store at least computer-readable instructions that, when executed by one or more processors of a computing device, causes the computing device to perform controller operations to perform the method of claim 1.

* * * * *